United States Patent
Reisman

[19]

[11] Patent Number: 6,125,388

[45] Date of Patent: Sep. 26, 2000

[54] SYSTEM FOR TRANSPORTING INFORMATION OBJECTS BETWEEN A USER STATION AND MULTIPLE REMOTE SOURCES BASED UPON USER MODIFIABLE OBJECT MANIFEST STORED IN THE USER STATION

[76] Inventor: Richard R. Reisman, 20 E. 9th St. #14K, New York, N.Y. 10003

[21] Appl. No.: 08/982,157

[22] Filed: Dec. 1, 1997

Related U.S. Application Data

[63] Continuation of application No. 08/251,724, May 31, 1994, Pat. No. 5,694,546.

[51] Int. Cl.[7] .......................... G06F 15/16; G06F 15/163; G06F 15/76; G06F 7/00
[52] U.S. Cl. .......................... 709/218; 709/200; 709/201; 709/203; 709/217; 709/219; 709/250; 709/300; 709/303; 707/1; 707/10; 707/100; 707/103; 707/104; 712/28
[58] Field of Search .................................... 345/333, 331, 345/356; 375/257; 379/45, 112; 395/712, 500.46, 701, 702, 703, 710; 364/134; 370/407, 420; 380/4, 24, 49; 428/142; 705/27, 35, 37; 707/1, 3, 8, 10, 100, 101, 103, 104, 200, 201, 203, 204, 205, 206, 303, 305; 709/101, 104, 201, 203, 206, 217, 218, 221, 223, 224, 231, 236, 246, 250, 300, 303, 219; 711/111, 133, 152, 203; 712/28

[56] References Cited

U.S. PATENT DOCUMENTS

| | | | |
|---|---|---|---|
| 4,274,139 | 6/1981 | Hodgkinson et al. | 709/203 |
| 4,432,057 | 2/1984 | Daniell et al. | 707/8 |
| 4,528,643 | 7/1985 | Freeny, Jr. | 364/900 |
| 4,558,413 | 12/1985 | Schmidt et al. | 707/203 |
| 4,604,686 | 8/1986 | Reiter et al. | 395/500.46 |
| 4,635,189 | 1/1987 | Kendall | 364/200 |
| 4,714,992 | 12/1987 | Gladney et al. | 707/206 |
| 4,714,995 | 12/1987 | Materna et al. | 707/201 |
| 4,745,559 | 5/1988 | Willis et al. | 705/37 |
| 4,746,559 | 5/1988 | Nishikawa | 428/142 |
| 4,760,572 | 7/1988 | Tomikawa | 370/94 |
| 4,815,030 | 3/1989 | Cross et al. | 707/10 |
| 4,935,870 | 6/1990 | Burke, Jr. et al. | 709/203 |
| 4,974,149 | 11/1990 | Valenti | 709/217 |
| 4,984,155 | 1/1991 | Geier et al. | 364/401 |

(List continued on next page.)

FOREIGN PATENT DOCUMENTS

| | | | |
|---|---|---|---|
| 360229138A | 11/1985 | Japan | G06F 7/28 |
| 362053085A | 3/1987 | Japan | H04N 7/173 |
| 403230234A | 10/1991 | Japan | G06F 12/00 |
| 404142620A | 5/1992 | Japan | G06F 9/06 |
| WO 97/32251 | of 0000 | WIPO . | |

OTHER PUBLICATIONS

"Head's Up Your Story Request," by Mike Langberg, San Jose Mercury News, CA, CD–ROM Column, Knight Ridder, Tribune Business News, File 10424154.800, Apr. 24, 1994.

"CD–ROM's: They're Not Just for Entertainment," by Laurie Flynn, The New York Times, Sunday, Apr. 24, 1994, p. 10.

1994 Intermediate Conference, San Jose, CA, Mar. 1–3, 1994 (7 pages.).

(List continued on next page.)

*Primary Examiner*—Thomas C. Lee
*Assistant Examiner*—Tanh Nguyen
*Attorney, Agent, or Firm*—Westerlund & Powell, P.C.; Robert A. Westerlund; Raymond H.J. Powell Jr.

[57] ABSTRACT

A novel electronic information transport component can be incorporated in a wide range of electronic information products, for example magazine collections, to automate the mass distribution of updates, such as current issues, from a remote server to a wide user base having a diversity of computer stations. Advantages of economy, immediacy and ease of use are provided. Extensions of the invention permit automated electronic catalog shopping with order placement and, optionally, order confirmation. A server-based update distribution service is also provided.

30 Claims, 6 Drawing Sheets

U.S. PATENT DOCUMENTS

| | | | |
|---|---|---|---|
| 5,008,814 | 4/1991 | Mathur | 709/221 |
| 5,008,853 | 4/1991 | Bly et al. | 345/331 |
| 5,019,963 | 5/1991 | Alderson et al. | 707/201 |
| 5,133,075 | 7/1992 | Risch | 707/201 |
| 5,155,847 | 10/1992 | Kirouac et al. | 709/221 |
| 5,157,783 | 10/1992 | Anderson et al. | 395/600 |
| 5,185,697 | 2/1993 | Jacobs et al. | 379/45 |
| 5,187,787 | 2/1993 | Skeen et al. | 709/300 |
| 5,220,501 | 6/1993 | Lawlor et al. | 380/24 |
| 5,220,657 | 6/1993 | Bly et al. | 711/152 |
| 5,226,161 | 7/1993 | Khoyi et al. | 709/303 |
| 5,257,369 | 10/1993 | Skeen et al. | 709/300 |
| 5,287,504 | 2/1994 | Carpenter et al. | 707/201 |
| 5,297,249 | 3/1994 | Bernstein et al. | 345/356 |
| 5,303,379 | 4/1994 | Khoyi et al. | 395/710 |
| 5,319,542 | 6/1994 | King, Jr. et al. | 364/401 |
| 5,359,730 | 10/1994 | Marron | 395/712 |
| 5,379,424 | 1/1995 | Morimoto et al. | 395/600 |
| 5,404,488 | 4/1995 | Kerrigan et al. | 711/133 |
| 5,406,557 | 4/1995 | Baudoin | 370/407 |
| 5,421,009 | 5/1995 | Platt | 709/221 |
| 5,426,747 | 6/1995 | Weinreb et al. | 711/203 |
| 5,440,744 | 8/1995 | Jacobson et al. | 709/203 |
| 5,442,791 | 8/1995 | Wrabetz et al. | 709/104 |
| 5,452,447 | 9/1995 | Nelson et al. | 707/205 |
| 5,473,772 | 12/1995 | Halliwell et al. | 395/712 |
| 5,485,370 | 1/1996 | Moss et al. | 709/217 |
| 5,491,800 | 2/1996 | Golsmith et al. | 709/221 |
| 5,491,820 | 2/1996 | Belove et al. | 707/3 |
| 5,495,610 | 2/1996 | Shing et al. | 709/221 |
| 5,497,491 | 3/1996 | Mitchell et al. | 709/303 |
| 5,499,343 | 3/1996 | Pettus | 709/203 |
| 5,515,508 | 5/1996 | Pettus et al. | 709/203 |
| 5,519,769 | 5/1996 | Weinberger et al. | 379/112 |
| 5,519,875 | 5/1996 | Yokoyama et al. | 709/303 |
| 5,528,490 | 6/1996 | Hill | 395/712 |
| 5,530,852 | 6/1996 | Meske | 709/206 |
| 5,539,735 | 7/1996 | Moskowitz | 370/420 |
| 5,541,991 | 7/1996 | Benson et al. | 380/4 |
| 5,544,320 | 8/1996 | Konrad | 79/201 |
| 5,548,726 | 8/1996 | Pettus | 709/221 |
| 5,553,223 | 9/1996 | Greenlee et al. | 345/333 |
| 5,555,427 | 9/1996 | Aoe et al. | 709/201 |
| 5,557,793 | 9/1996 | Koerber | 707/103 |
| 5,557,798 | 9/1996 | Skeen et al. | 705/35 |
| 5,560,012 | 9/1996 | Ryu et al. | 395/701 |
| 5,564,051 | 10/1996 | Halliwell et al. | 707/200 |
| 5,566,302 | 10/1996 | Khalidi et al. | 709/300 |
| 5,572,643 | 11/1996 | Judson | 709/218 |
| 5,577,244 | 11/1996 | Killebrew et al. | 395/703 |
| 5,577,251 | 11/1996 | Hamilton et al. | 709/101 |
| 5,581,755 | 12/1996 | Koerber et al. | 707/103 |
| 5,581,761 | 12/1996 | Radia et al. | 395/702 |
| 5,581,764 | 12/1996 | Fitzgerald et al. | 395/703 |
| 5,586,311 | 12/1996 | Davies et al. | 707/1 |
| 5,586,326 | 12/1996 | Ryu et al. | 395/701 |
| 5,594,910 | 1/1997 | Filippe et al. | 712/28 |
| 5,596,720 | 1/1997 | Hamada et al. | 709/206 |
| 5,596,746 | 1/1997 | Shen et al. | 707/101 |
| 5,600,834 | 2/1997 | Howard | 707/201 |
| 5,602,993 | 2/1997 | Stromberg | 395/712 |
| 5,606,493 | 2/1997 | Duscher et al. | 364/134 |
| 5,608,874 | 3/1997 | Ogawa et al. | 709/246 |
| 5,615,112 | 3/1997 | Liu Sheng et al. | 707/104 |
| 5,619,710 | 4/1997 | Travis, Jr. et al. | 709/203 |
| 5,623,605 | 4/1997 | Keshav et al. | 709/236 |
| 5,623,656 | 4/1997 | Lyons | 707/10 |
| 5,623,661 | 4/1997 | Hon | 707/1 |
| 5,625,818 | 4/1997 | Zarmer et al. | 707/104 |
| 5,628,005 | 5/1997 | Hurvig | 707/8 |
| 5,630,066 | 5/1997 | Gosling | 709/221 |
| 5,630,092 | 5/1997 | Carreiro et al. | 711/111 |
| 5,630,116 | 5/1997 | Takaya et al. | 707/201 |
| 5,634,010 | 5/1997 | Ciscon et al. | 709/223 |
| 5,640,564 | 6/1997 | Hamilton et al. | 709/303 |
| 5,644,764 | 7/1997 | Johnson et al. | 707/103 |
| 5,646,992 | 7/1997 | Subler et al. | 380/4 |
| 5,649,192 | 7/1997 | Stucky | 707/103 |
| 5,652,887 | 7/1997 | Dewey et al. | 709/303 |
| 5,664,207 | 9/1997 | Crumpler et al. | 707/505 |
| 5,668,997 | 9/1997 | Lynch-Freshner et al. | 707/303 |
| 5,673,322 | 9/1997 | Pepe et al. | 380/49 |
| 5,680,548 | 10/1997 | Trugman | 709/226 |
| 5,680,617 | 10/1997 | Gough et al. | 707/104 |
| 5,682,532 | 10/1997 | Remington et al. | 709/303 |
| 5,684,984 | 11/1997 | Jones et al. | 707/10 |
| 5,684,991 | 11/1997 | Malcolm | 707/204 |
| 5,689,708 | 11/1997 | Regnier et al. | 709/229 |
| 5,694,549 | 12/1997 | Carlin et al. | 709/250 |
| 5,706,434 | 1/1998 | Kremen et al. | 709/218 |
| 5,708,780 | 1/1998 | Levergood et al. | 395/200.12 |
| 5,710,918 | 1/1998 | Lagarde et al. | 707/10 |
| 5,715,314 | 2/1998 | Payne et al. | 380/24 |
| 5,721,911 | 2/1998 | Ha et al. | 707/100 |
| 5,724,424 | 3/1998 | Gifford | 380/24 |
| 5,761,649 | 6/1998 | Hill | 705/27 |
| 5,761,677 | 6/1998 | Senator et al. | 707/203 |
| 5,761,678 | 6/1998 | Bendert et al. | 707/204 |
| 5,768,528 | 6/1998 | Stumm | 709/231 |
| 5,790,793 | 8/1998 | Higely | 709/218 |
| 5,809,076 | 9/1998 | Hofmann | 375/257 |
| 5,812,776 | 9/1998 | Gifford | 395/200.47 |
| 5,862,325 | 1/1999 | Reed et al. | 709/201 |
| 5,909,492 | 6/1999 | Payne et al. | 380/24 |

OTHER PUBLICATIONS

"Microsoft Complete Baseball" Product Brochure, Microsoft Corp. product announced Mar. 1, 1994.

CompuServe Introductory Membership, CompuServe, Print Date Dec. 1992.

"Plug and Play Making Add–In Cards Play Automatically," Intel Technology Briefing (4 pages).

Daily Federal Register, 1993, Counterpoint Publishing, Fall 1993.

The Federal Register, Product Brochure, Counterpoint Publishing, Fall 1993.

"Counterpoint's Compact Disk Federal Register" order form, Counterpoint Publishing.

"Code of Federal Regulations on CD–ROM," Counterpoint Publishing.

"Compact Disk of Federal Register" price list, Counterpoint Publishing Co., Jul. 1, 1993.

"Microsoft Messaging Application Program Interface (MAPI)," created Jan. 1993, Microsft Corp.

"WOSA Backgrounder: Delivering Enterprise Services to the Windows–Based Desktop," created Jul. 1993, Microsoft Corp.

"RemoteWare Software Licenses," fee list, Xcellenet, Inc., Aug. 16, 1993.

"RemoteWare Server," product brochure, Xcellenet, Inc., 1992.

"RemoteWare Communications Management System," product brochure, Xcellenet, Inc.

"RemoteWare Mail," product brochure, Xcellenet, Inc.

"RemoteWare Documents," product brochure, Xcellenet, Inc., 1992.

"Remote Ware Reports," product brochure Xcellenet, Inc., 1992.

"Software Solution Helps Pull Satellite Offices into Network Environment," by Kathleen Doler, Investors Business Daily, Mar. 10, 1993, vol. 9, No. 231.

"Simple MAPI," Microsoft Corp., 1993.

The Frye Utilities for Networks, "Software Update and Distribution System," Frye Computer Systems, Inc., Copyright 1992.

David Snyder, "The Poor Man's Mirror Script," 8 page printout of software documentation, Nov. 30, 1984.

Fitzpatrick et al., "Automatic Mirroring of the IRAF FTP and WWW Archives," Contents of WWW Web Site, http//iraf.nano.edu:80/project/mirror/, as of Mar. 18, 1997.

Online Business Today Archives, Home Page Press, Inc., Contents of WWW Web Site, http://www.hpp.com/s–clickshare95.html, as of Mar. 19, 1997.

"Go–Get–It, Internet Personal Agent Thrills Net Users," NorthTech Software Inc., 1994, Contents of WWW Web Site, http://www.hpp.com/gogetit.html, as of Mar. 19, 1997.

"Mirror Applescript—Find Your Salvation with a Mirror Script for the Macintosh?," Jim Matthews, Contents of http://www.darmouth.edu/pages/softdev/fetch.html, as of Mar. 18, 1997.

"NetTerm—The Ultimate telnet experience?," InterSoft International, Inc., Contents of http://starbase.neosoft.com/zkrr01/netterm.html, as of Mar. 18, 1997.

"Intermind Announces Approval of First Patent Application," Intermind Corporation Press Release, http://www.intermind.com/inside/press_rel/100797/allow.html, as of Oct. 1997.

"About Intermind's Channel Communications Patents," Intermind's Patent Description, http://www.intermind.com/material/patent desc.htm.l.

"Frequently Asked Questions about Intermind's Patents," Intermind Corporation Patent FAQ, http://www.intermind.com/material/patent_faq.html.

"ProComm" Reference Manual, Datastorm Technologies, Inc., 1986.

"Central Point Commute: Fast Remote Control of PCS Running Windows or DOS," Central Point Sortware, Inc., 1992.

"Beyond Store and Forward: Extending ESD: Xcellenet Routing Server Cut Out the Middleman," Data Communications, Jun. 1993.

"CompuServe" Quick Start Guide, CompuServe, 1994.

"When Worlds Collide," CD Rom World, Nov. 1994.

Intermedia Conference, (transcript), Mar. 1994., pp. 81–83 and 1 other.

"Exploring Hybrid World of CD–Rom/On–Line Products," Multimedia Week, Mar. 7, 1994.

"What is CompuServeCD?," received Apr. 29, 1994.

"Software Distribution Is Still a Bad Dream," PC Week, Mar. 28, 1994, p. 54.

"WebWhacker," (Guide), ForeFront Group, Inc., 1995.

"Browsers Make Navigating the World Wide Web a Snap," The New York Times, Jan. 29, 1995.

"Interactive Media Woks Debuts sampleNET," Interactive Media Works, news release dated Jul. 17, 1995.

Digital Delivery Product Data Sheet, Digital Delivery, Inc., Sep. 17, 1995.

Digital Delivery Launches Unique Delivery Agent; Introduces First Delivery Agent to Seamlessly Provide PC Users With Fully–Formatted Content, Business Wire, Oct. 3, 1995.

CMP is First Technology Publisher to Deliver Web Content to the Desktop, CMP News, Oct. 18, 1995.

"The Future of Audio CD's," Microsoft CD Plus Event Page, Microsoft Corp., Dec. 4, 1995.

"Marketing via Teleshuttle," Letter from Richard Reisman to Lou Jordan dated May 22, 1995 with enclosure,"A Short White Paper on the Teleshuttle Solution," Teleshuttle, May 5, 1995.

"LinkStar Announces Site Launcher," LinkStar Communications Corporation, Feb. 26, 1996.

"Frontier Technologies' CyberSearch 2.0 Internet Search Tool Now Works With Popular Browsers," Frontier Technologies Corporation, Apr. 5, 1996.

"CyberSearch 2.0 Beta Manual," Frontier Technologies Corporation, Apr. 5, 1996.

"CD Plus Technical Information," Microsoft CD Plus Event Page, Microsoft Corp., Dec. 4, 1995.

"Open Market Announces New Desktop Software to Delivery Resources of the World Wide Web Directly to the User," OM–Express News Release, Apr. 16, 1996.

"How to Publish an OM–Express Package," OM–Express Product Information, Apr. 16, 1996.

"MarketScape WebCD 1.0 Bypasses Internet Bottlenecks," MarketScape Press Release, MarketScape, Inc., Aug. 26, 1996.

"Reality's Wealth Builder 3.0" User's Guide, Money Magazine, Reality Technologies, Inc., 1992.

"Reality's Wealth Builder" Version 3.1 Supplement, Money Magazine, Reality Technologies, Inc., Apr., 1993.

"Aren't you glad you waited?," QmodemPro for Windows Advertisement, Mustang Software, Inc.

"XcelleNet RemoteWare: Integrated Mobile Communications," Operations Automation Strategies Research Note, Jul. 26, 1993.

"About Marimba: A Word from Marimba's President and CEO, Kim Polese," Contents of WWW Web Site http://www.marimba.com/about executive_over.html as of Nov. 17, 1998.

"Marimba Products: Marimba's Castanet™: An Essential Part of Your E–Business InFrastructure," Content of WWW Web Site http://www.marimba.com/product/content/product.html as of Nov. 17, 1998.

"Marimba Library," Contents of WWW Web Site, http://www.marimba.com/datasheets/ as of Nov. 17, 1998.

Dow Jones News Service (DowVision™) Lecture Presentation Handout, lecture presented by Charles I. Brady at the Wall Street Workstation Conference, New York City, NY, Oct. 11–12, 1989.

Lecture Presentation Notes on the Folio World–Wide–Web Retriever 3.1, presented by Jeff Gammon at the Infobase '95 Conference, Copyright 1995.

C. Bowman, P. Danzig, D. Hardy, U. Manber, M. Schwartz & D. Wessels "Harvest: A Scalable, Customizable Discovery and Access System" Mar. 12, 1995.

D. Hardy & M. Schwartz "Customized Information Extraction as a Basis for Resource Discovery" Mar. 1994.

William G. Camargo "The Harveset Broker," Dec. 1994.

D. Bulterman, G. van Rossum and R. van Liere "A Structure for Transportable, Dynamic Multimedia Documents" US–ENIX, Summer '91 Nashville, TN.

G. Almes and C. Holman "Edmas: An Object–Oriented, Locally Distributed Mail System" IEEE Transactions on Software Engineerng, Sep. 1987.

G. Almes, A. Black, C. Bunie and Weibe "Edmas: A Locally Distributed Mail System" IEEE, 1984.

W. Bender, H. Lie, J. Orwant, L. Teodosio, & N. Abramsom "Newspace: Mass Media and Personal Computing," USENIX—Summer '91—Nashville TN.

R. Thomas, H. Forsdick, T. Crowley, R. Schaaff, R. Tomlinson & V. Travers "Diamond: A Multimedia Message System Built on a Distributed Architecture" IEEE, Dec. 1994.

S. Ramanathan & P.V. Rangan "Architectures for Personalized Multimedia" IEEE, 1994.

N. Yankelovich, B. Haan, N. Meyrowitz & S. Drucker "Intermedia: The Concept and the Construction of a Seamless Information Environment" IEEE, Jan. 1988.

D. Woelk, W. Kim & W. Luther, "An Object–Oriented Approach to MultiMedia Database," ACM 1986.

N. Borenstein. C. Everhart, J. Rosenberg, A Stoller "A Multi–media Message System for Andrew" USENIX Winter Conference Feb., 1988.

S. Jackson & N. Yankelovich "InterMail: A Prototype Hypermedia Mail System" Hypertext 91 Proceedings Dec. 1991.

E. Hoffert & G. Gretsch, "The Digital News System at Ed.ucom: A Convergence of Interactive Computing Newspaper, Television and High Speed Networks" Communications of the ACM Apr. 1991.

D. Crocker, E. Szurkowski & D. Farber "An Internetwork Memo Distribution Capability—MMDF" IEEE, ACM 1979.

Douglas Engelbart "Authorship Provisions in Augment" IEEEE, 1984.

J.J. Garcia–Luna–Aceves "Towards Computer–Based Multimedia Information Systems" Computer Message System 85, 1986.

Debra P. Deutsch, "Implementing Distribution Lists in Computer–Based Message Systems," Computer–Based Message Services, IFIP, 1984.

T. Purdy, D. Thorslund & N. Witchlow "Meridian SL Messaging" Computer Message Systems—85 IFIP, 1986.

Michael Tschichholz "Message Handling System: Requirements to the User Agent" Computer Message Systems—85, IFIP, 1986.

Lother Wosnitza "Group Communication in the MHS Context" Computer Message Systems 85 IFIP, 1986.

Jacob Palme "Distribution Agents (mailing lists) in Message Handling Systems" Computer Message Systems 85 IFIP, 1986.

Teresa F. Lunt "A Model for Message System Security" Computer Message Systems 85 IFIP, 1986.

A. Roger Kaye "A User Agent for Multiple Computer–Based Message Services" Computer–Based Message Services, IFIP 1984.

Paul Wilson "Structure for Mailbox System Applciations" Computer–Based Message Services, IFIP 1984.

J. Postel, G. Finn, A. Katz & J. Reynolds "The ISI Experimental Multimedia Mail System" Information Sciences Institute, Sep. 1986.

E. Moeller, A Scheller & G. Schurmann "Distributed Processing of Multimedia Information" IEEE Computer Society Proceedings May 28–Jun. 1, 1990.

Richard L. Phillips "An Interpersonal Multimedia Visualization System" IEEE Computer Graphics & Applications IEEE 1991.

Jacob Palme "You Have 134 Unread Mail! Do You Want to Read Them Now?" Computer–Based Message Services IFIP, 1984.

M. Papa, G. Raguiccini, G. Corrente, M. Ferrise, S. Giurleo and D. Vitale "The Development of an Object–Oriented Multimedia Information System" Lecture Notes in Computer Science, Sep. 1994.

Silvano Maffeis "A Flexible System Design to Support Object–Groups and Object–Oriented Distributed Programming" Lecture Notes in Computer Science, Jul. 1993.

R. Gotze, H. Eirund & R. Claass in "Object–Oriented Dialog Control for Multimedia User Interfaces" Lecture Notes in Computer Science—Human Computer Interaction Sep. 1993.

Chris Maeda "A Metaobject Protocol for Controlling File Cache Management" Lecture Notes in Computer Science, Mar. 1996.

A. Joseph, A. deLespinasse, J. Tauber, D. Gifford & M. Kaashoek "Rover" A Toolkit for Mobile Information Access SIGOPS '95 1995. ACM.

Wolfgang Lux "Adaptable Object Migration: Concept and Implementation" Operating Systems Review Apr. 1995.

R. Campbell, N. Islam, R. Johnson, P. Kougiouris & P. Madany "Choices, Frameworks and Refinement" Department of Computer Science, University of Illinois, Dec. 1991.

Klemens Bohm & Thomas C. Rakow "Metadata for Multimedia Documents" SIGMOD Record, vol. 23, No. 4, Dec. 1994.

Simon Gibbs "Composite Multimedia and Active Objects" OOPSLA '91.

T. Purdin, R. Schlichting & G. Andrews "A File Replication Facility for Berkeley Unix" Software Practice and Experience, vol. 17, Dec. 1987.

A. Black, N. Hutchinson, E. Jul & H. Levy "Object Structure in the Emerald System" OOPSLA '86 Proceedings.

Daniel T. Chang "Coral: A Concurrent Object–Oriented System for Constructing and Executing Sequential, Parallel and Distributed Applications" OOPS Messenger, Apr. 1991.

A. Birrell, G. Nelson, S. Owicki & E. Wobber "Network Objects" Proceedings of the 14$^{th}$ ACM Symposium on Operating Systems Principles, Dec. 5–8, 1993.

Jacques Ferber "Computational Reflection in Class based Object Oriented Languages" OOPSLA '89 Proceedings.

Michael Caplinger "An Information System Based on Distributed Objects" OOPSLA '87 Proceedings.

C. Fung & M. Pong "MOCS: an Object–Oriented Programming Model for Multimedia Object Communication and Synchronization" 1994 IEEE.

T. Hase & M. Matsuda "A New Audio–Visual Control Using Message Object Transmission", 1994 IEEE, Nov. 1994.

F. Horn & J. Stefani "On Programming and Supporting Multimedia Object Synchronization" The Computer Journal, vol. 36, No. 1, 1993.

T. Little & A. Ghafoor Spatio–Temporal Composition of Distributed Multimedia Objects for Value–Added Networks, IEEE, 1991.

M. Vazirgiannis & C. Mourlas "An Object–Oriented Model for Interactive Multimedia Presentations" The Computer Journal, vol. 36, No. 1, 1993.

T. Little & A. Ghafoor "Synchronization and Storage Models for Multimedia Objects" 1990 IEEE, Apr. 1990.

Cosmos Nicolaou "Architecture for Real–Time Multimedia Communications Systems", 1990 IEEE, Apr. 1990.

Ralf Steinmetz "Synchronization Properties in Multimedia Systems" 1990 IEEE, Apr. 1990.

T. Little & A. Ghafoor "Network Considerations for Distributed Multimedia Object Composition and Communication" 1990 IEEE Network Magazine, Nov. 1990.

K. Smith and S. Zdonik "Intermedia: A Case Study of the Differences Between Relational and Object–Oriented Database Systems" OOPSLA '87 Proceedings.

S. Ramanathan & P. Rangan "Architectures for Personalized Multimedia" 1994 IEEE.

Marvin Sirbu and J.D. Tygar, "Netbill: An Intenet Commerce System Optimized For Network–Delivered Services", IEEE Personal Communications Magazine, pp. 34–39, Aug. 1995.

Henrik Eriksson, "Expert System As Knowledge Servers", IEEE Expert Magazine, pp. 14–19, Jun. 1996.

Budi Yuwono and Dik Lun Lee, "Wise: A World Wide Web Resource Database System", IEEE Transactions on Knowledge and Data Engineering, vol. 8, No. Aug. 1996.

H. Penny Nii "Blackboard Systems" The A1 Magazine, Summer, 1986.

AppleShare, Apr. 1995.

"Manual Page for Unix NFS Mount Command".

"Manual Page for Unix FSTAB Command".

Phil Lapsley and Brian Kantor "Network News Transfer Protocol", Feb. 1986.

Brian Kantor and Phil Lapsley, Network News Transfer Protocol, "A Proposed Standard for the Stream–Based Transmission of News", Feb. 1986.

M. Crispin "Network Working Group", University of Washington, Dec. 1996.

Terry Gray Comparing Two Approaches to Remote Mailbox Access: IMAP vs. POP, University of Washington.

Terry Garry "Message Access Paradigms and Protocols", University of Washington, Aug. 1995.

UNIX User's Reference Manual (URM), 4.3 Berkley Software Distribution Virtual VAX–11 Version, Apr. 1986 (including the description of a RDIST—a remote file distribution program—4 pages).

UNIX System Manager's Manual (SMM), 4.3, Berkeley Software Distribution Virtual VAX–11 Version, Apr. 1986 (including a document entitled "A Fast File System for UNIX," by Marshall McKusick et al., pp. SMM 14–1 through SMM 14–15).

Nachbar, Daniel, "When Network File Systems Aren't Enough: Automatic Software Distribution Revisited," Proceedings of the USENIX Association Summer Conference, pp. 159–171, Atlanta, GA, Jun. 9–13, 1986 (including a description of a method and system for updating computer files called "Track").

Mockapetris, P., "Domain Names—Implementation and Specification," Network Working Group, Request for Comments—883, Nov. 1983.

Saltzer, J., "On the Naming and Binding of Network Destinations," Network Working Group, Request for Comments—1498, Aug. 1993.

A. DeScon and R. Braden, Background File Transfer Program (BFTP), Network Working Group Request for Comments: 1068, Aug. 1988.

Lee McLoughlin, usr/bin/perl—Mirror Master—Run Several Mirrors in Parallel, URL:strucbio.biologie.uni–konstanz.de/pdb/mirror/mm, Jan. 18, 1994.

Jack Lund, local/bin/perlbin/perl—urlget—Get a Document Given a WWW URL, URL:www.chemie.uni–dortmund.de/~loki/exp/urlget, Mar. 23, 1994.

Mirror(1L) Misc. Reference Manual Pages Mirror(1L)Name mirror—mirror packages on remote sites, URL:nic.funet.fi/FUNET/hamster/mirror.txt, Dec. 2, 1993.

Article 5397 of comp.lang.perl: Xref: feenix.metronet.com comp.infosystems.www:1336 comp.lang.perl:5397, URL:ftp.telecom.sk/pub/mirror/CPAN/scripts/i...WWW//http.get.pl, Aug. 25, 1993.

Article 3893 of comp.lang.perl: Xref: feenix.metronet.com comp.lang.perl:3893, URL:www.metronet.com/perlinfo/scripts/ftpstuff/ftpget, Jul. 1, 1993.

Article 10383 of comp.lang.perl., URL:www.metronet.com/perl/scripts/ftpstuff/ftpr, Apr. 6, 1993.

SYSTEM FOR TRANSPORTING INFORMATION OBJECTS BETWEEN A USER STATION AND MULTIPLE REMOTE SOURCES BASED UPON USER MODIFIABLE OBJECT MANIFEST STORED IN THE USER STATION

This application is a continuation of application Ser. No. 08/251,724 filed May 31, 1994, now U.S. Pat. No. 5,694,546 dated Dec. 2, 1997.

TECHNICAL FIELD

The present invention relates to computer-implemented transport of electronic information objects. More specifically it relates to information transport software which can be used for transporting information objects between a remote server and any one of multiple, uncoordinated intelligent computer workstations. Still more particularly, it provides a computer-implemented software component that can be used to facilitate the distribution of information objects from a remote source to a large number of customers or subscribers.

BACKGROUND

Electronic publication is an exploding industry in which thousands of new products including magazines and periodicals, software applications and utilities, video games, business, legal and financial information and databases, encyclopedias and dictionaries are purchased by millions of customers. Commonly, such information products are replicated in computer-readable form on magnetic or optical storage diskettes and are box-packaged with printed manuals for distribution to retail stores and direct mail sales. These marketing practices are relatively expensive and involve a significant time lag of at least days or weeks to get a product into a consumer's hands once it is created.

Such costs and delays are generally acceptable for original, high value products such as collections of publications or software application, of which some examples are NEWSWEEK® Interactive CD-ROM, or disks, which provides a searchable audio-visual library of issues of NEWSWEEK magazine and CINEMANIA® CD-ROM which provides reviews and other information on newly released films. For time-sensitive, low-value updates, for example, the latest issue of Newsweek or last week's movie reviews, distribution in stored form, on physical media, is slow and the cost may exceed the value of the information in the product.

Thus, electronic transfer from a central computer server to a subscriber's computer over common carriers or wide area networks is an attractive proposition. Similar considerations apply to the distribution of software program updates, although cost and frequency of issue are not such serious constraints. A problem faced in both situations is that of incorporating the received material with the original material so that a fully integrated publication, information database or software program is obtained by the user.

Another class of electronically distributed information product comprises home shopping catalogues of mail order products distributed on optical or other digital data storage disks which may contain text, sound and images from printed catalogues or uniquely created material, for example software application demos. To applicant's knowledge and belief, available products lack any computer order placement capability, requiring orders to be placed by voice call.

Communication between remote computers, not directly interconnected by umbilical cable or a wired network, is enabled by a wide range of hardware devices and software drivers, utilities, applications and application modules. Telephone modems that couple a computer with the telephone network are familiar devices. RF modems that couple computers into wireless networks are less familiar but are beginning to appear in consumer devices known broadly as personal information communicators (PIC's) of which personal digital assistants (PDA's) such as Apple Corp.'s NEWTON® product are a first generation. New kinds of digital communications devices can be expected to emerge as digital technology replaces analog transmission.

General-purpose, online, modem-accessed, electronic information services, such as PRODIGY, COMPUSERVE and AMERICA ONLINE (trademarks), and some Internet services, provide wide access to timely information products from a central server, but are limited and complex. They provide no means for the integration of downloaded information with information products offered on disk or CD, and provide only rudimentary facilities for local viewing and search of downloaded files.

Such online information services provide their own user interface which is generally unlike that of a disk or CD-based information product, and can be customized very little, if at all, by a publisher using the service for product distribution.

Online services are oriented to extended online sessions which require complex user interaction to navigate and find desired information objects. Initial setup and use is rendered complex by requirements related to extended session use of data networks and the frequent need to navigate across the network, and through massive data collections, to locate desired data items. General-purpose online information services do not provide a suitable medium for electronic information publishers to distribute updates, and the like, because of limited interface flexibility, because a publisher cannot expect all their customer base to be service subscribers, and because of cost and payment difficulties. Such services are centered on monolithic processes intended for national use by millions of subscribers which processes are not readily adaptable.

Online service charging mechanisms are also inflexible and inappropriate for most individual information products, requiring monthly subscription fees of $5–10 or more, plus time charges for extended use, which are billed directly to users, after a user sign-up and credit acceptance process. Such cost mechanisms are too expensive and too complex for distribution of many products such as magazine and other low cost update products. They do not presently permit a publisher to build an access fee into a purchase price or a product subscription.

Recent press announcements from corporations such as AT&T, Lotus, Microsoft and MCI describe plans for new online services providing what are called "groupware" services to offer rich electronic mail and group collaboration functions, primarily for business organizations. Although offering multiple electronic object transport operations such services are believed to have complex setup procedures and software requirements and complex message routing features and protocols, and to lack interface flexibility. Accordingly, they are not suitable for mass distribution of low cost electronic information update products and cannot achieve the objectives of the invention.

Communications Products

Many software products exist that enable one computer to communicate with another over a remote link such as a telephone cable or the air waves, but none enables a vendor substantially to automate common carrier mass distribution of an electronic information product to a customer base employing multiple heterogenous systems with indeterminate hardware and software configurations. Two examples of popular such software products are Datastorm Technologies, Inc.'s PROCOMM (trademark) and CENTRAL POINT COMMUTE (trademark) from Central Point Software, Inc. which are commonly used to provide a variety of functions, including file transfers between, interactive sessions from, host-mode services from, and remote computer management of, modem-equipped personal computers wired into the telephone network.

Counterpoint Publishing's Federal Register Publications

Counterpoint Publishing, (Cambridge Mass.) in brochures available to applicant in November 1993 offered electronic information products entitled "Daily Federal Register" and "CD Federal Register". "Daily Federal Register" includes communications software and a high-speed modem. Apparently, the communications software is a standard general purpose communications package with dialing scripts that are customized to the needs of the Federal Register products. Accordingly, the cost of a communications package license which may be as high as about $100 at retail must be included with in the product cost. Also, Counterpoint Publishing avoids the difficulties of supporting various modems by providing its own own standard modem, with the product, building in a cost (about $100–200) which renders this approach quite unsuitable for mass-market distribution of low cost electronic information update products. The resulting product is not seamless either in its appearance or its operation because the communications software is separately invoked and used, and has its own disparate look and feel to the user.

The "CD Federal Register" provides the Federal Register on CD-ROM at weekly intervals for $1,950.00 and CD-ROM disks are shipped to customers as they become available. Back issues are $125 each. Updates are provided by shipping a disk. The Federal Register is a high-value product intended for specialist, business, academic and governmental users. Distribution of updates on CD-ROM, as utilized by Counterpoint Publishing, is not a suitable method for lower value products such as a weekly news magazine, because of the associated costs. Shipping delays are a further drawback.

While the two product "CD Federal Register" and "Daily Federal Register" might be used together, at an additive cost, to provide a combination of archives on CD-ROM plus daily updates obtained and stored until replaced by a new CD-ROM, based on information available to the present inventor it appears that the two products must be used separately. Thus they must apparently be viewed, searched, and managed as two or more separate collections, requiring multiple steps to perform a complete search across both collections, and requiring manual management and purging of the current collection on hard disk by the user.

Xcellenet's "REMOTEWARE"®

Xcellenet Inc. in product brochures copyrighted 1992 and a price list dated Aug. 16, 1993, for a "REMOTEWARE"® product line, offers a range of REMOTEWARE® software-only products providing electronic information distribution to and from remote nodes of a proprietary REMOTEWARE® computer network intended for use within an organized, corporate or institutional data processing or management information system. The system is primarily server directed, rather than user initiated and requires an expensive program (priced at $220.00) to run at the user's node whereas the present invention addresses consumer uses which will support costs of no more than a few dollars per node.

Further, REMOTEWARE® is primarily intended to be used with other REMOTEWARE® products at the node which other products provide a range of user interface and data management functions, at significant additional cost, each with their own separate user interface presenting a standard REMOTEWARE® look and feel. In addition, the nodes require a sophisticated central support and operations function to be provided, which may be difficult for an electronic information publisher to accomplish and add unacceptable expense.

REMOTEWARE® is overly elaborate to serve the simpler objectives of the present invention. Designed for the demanding needs of enterprise-wide data processing communications, the client or node package provides many functions such as background operation, ability to receive calls from the server at any time, ability to work under control of the central server to survey and update system software and files and an ability to support interactive sessions, which abilities are not needed to carry out the simpler information transport operations desired by the present invention. Such capabilities may be desirable in an enterprise MIS environment, but are not appropriate to a consumer or open commercial environment, and bring the drawbacks of complexity, cost, and program size, which may put undesirable operational constraints on the user (and perhaps even compromise the user's privacy). REMOTEWARE® is too costly and complex for mass distribution of updates to periodicals, cannot be shipped invisibly with an electronic information product and requires specialized server software and operations support that would challenge all but the largest and most technically sophisticated publishers. Accordingly, REMOTEWARE® is unsuitable for widespread use as an economical means of distributing updates for a variety of electronic information products.

Although it has wider applications, a significant problem addressed by the invention is the problem of economically distributing updates of electronic information products to a wide customer base that may number tens or hundreds of thousands, and in some cases, millions of consumers. At the date of this invention, such a customer base will normally include an extensive variety of computers, operating systems and communications devices, if the latter are present, all of which may have their own protocols and configuration requirements.

While an electronic information product vendor might consider licensing or purchasing an existing commercial communications product for distribution with their publication product to enable remote, diskless updating, the high cost of such a solution would generally be unacceptable because a communication package includes a broad range of functionalities not required for the vendor's particular purpose, for example, remote keyboarding. Significantly, a commercial communications package is not susceptible to customization of its user interface and may have its own configuration requirements and installation requirements, with regard to directories, device drivers and the like, which are incompatible with other vendor or user requirements or are simply a nuisance to the user. Thus, a commercial communications product in addition to its cost, cannot be satisfactorily integrated with an information product.

There is accordingly a need for computer-implementable information transport software to enable simple, economical and prompt mass distribution of electronic information products.

SUMMARY OF THE INVENTION

This invention solves a problem. It solves the problem of enabling simple, economical and prompt mass distribution of electronic information products.

The invention solves this problem by providing a computer-implemented information transport software module usable with any of multiple electronic information products for mass distribution of electronic information objects to users of a diversity of uncoordinated communications-equipped computer stations. The information transport software module is readily customized to an individual information product to have a user interface in said information product for activation of automated transport of an information object between a remote object source and a user's computer station. The information transport module contains user communications protocols specifying user station functions of the automated object transport and the object source is supplied with source communications protocols specifying source functions of the automated object transport. The source communications protocol is co-operative with the user communications protocol and knows the characteristics of the user communications protocol, so as to be able to effect the information object transport in unattended mode after initiation.

Preferably, for economy and simplicity, the information transport component is supplied for incorporation in an information product as a free-standing embeddable component comprising only such functionality as is required for the aforesaid information object transport operation as that operation is described above and as further elaborated herein. In a preferred embodiment, by limiting available functionality to predetermined transport operations, for example to information object transport between the user's address and one or more pre-specified remote addresses, or to transport of a pre-specified information object or objects, or by making both such limitations, a lean and efficient information transporter product can be provided. This enables an information product vendor to supply an automated, or unattended, update or other information transport facility to a mass market of computer users without the complexity and expense of proprietary network or communications software packages, or of the vendor developing their own transport software.

In a local area network, users communicating across a common medium such as ETHERNET (trademark), or TOKEN RING (trademark) can enjoy the relatively expensive benefits of coordination of traffic between users, and to and from network services, which benefits are provided by a network operating system such as LANTASTIC (trademark, Artisoft Corp.) or NETWARE (trademark, Novell, Inc.). In contrast, a mass market of computer users lacks coordinating means for the facilitation of remote communications between the users and a would-be provider of services to those users. The inventive information transport component, or transporter, efficiently fills that need. While the invention might be implemented for transport across a local area network, such use would probably be incidental to the provision of other services and may not be needed having regard to the sophisticated functions usually provided by relatively much more expensive local area network communication systems, for example, a network file system providing distributed file management functions permitting simple transport of files between network stations.

Typical communications equipment comprises a modem, but other cards and devices enabling remote communication between computers may be used, such as devices or means permitting communication in a digital rather than analog realm, for example, ISDN or ATM interfaces when they become commercially viable.

Preferably, the user communications protocols specify parameters such as a source address, which may be a common carrier address, such as a telephone number, and object parameters such as file name or names, file size, location content and format are specified, as appropriate, in either the user communications protocols or the source communications protocols, or both. Such object specification can be listed in an object manifest stored at the user's station, which preferably, for better control of the transport operation, is sent to the remote object source as a verifier.

By pre-specifying the desired transport functions to both ends of the transport operation, the user and the object source, a simplified, easy-to-use, automated transport operation which conveys an information object in unattended mode, after initiation, can be provided to any user.

The inventive information transport module provides an information product vendor with simplicity, modularity and generality enabling information fetch operations to be easily executed by novice users, and permitting inclusion in a wide range of information products with a minimum of customization. The invention is accordingly most suitable for electronic publishers to employ to enable their customers easily to update information products such, for example, as periodical collections, patent collections or software furnished on optical, magnetic or other storage devices.

In a preferred embodiment of the invention, the information object is pre-identified and integratable with the information product to which the transport module is customized to provide an augmented information product and the information transport component comprises:

a) a fetcher module configured to fetch said pre-identified object from said object source employing a pre-specified common carrier address stored in said fetcher module;

b) a communications manager to establish and manage connection to said object source under control of said fetcher module and with the assistance of said user and source communications protocols; and c) a fetched object integrator to locate a fetched object in a preset file area accessible to and known to said containing information product;

wherein said object pre-identification, said common carrier address and said preset file area specifications are stored in said software component, whereby a workstation user of said information product can automatically effect transport and integration of a pre-identified object from said object source to create an augmented information product at said workstation.

In this embodiment, any user can, easily and with varying degrees of automaticity, up to complete automation after initiation of transport or upon arrival of a scheduled transport time, obtain an update object and smoothly integrate it with an original product or product shell.

In a highly automated embodiment a containing information product, complete with transporter, is pre-coded with an update, reporting, or other schedule and, referencing the user's system clock, prompts the user for initiation of a transport operation at a scheduled date after distribution of the containing product, or fetches a schedule. If the user's system is shut down when the pre-scheduled date arrives, such prompt may be made at the first system boot or product use after that date.

The invention provides a closed-ended information transport operation between an information object source and any subscribing user, with no special commands or menu selections, which functions efficiently and, within the general parameters of an operating system's required environment, operates independently of the user's system configuration. Information transport operations are carried out automatically between communications modules that know what to expect from each other, avoiding difficulties arising from open-ended communications with a wide variety of users employing a diversity of heterogenous systems.

In another aspect, the invention provides a method of distributing predetermined electronic information objects from a remote object source to users of a diversity of uncoordinated modem-equipped computer stations, said method comprising:

a) supplying said users with an information transport module containing user communications protocols specifying user station functions of an automated object transport operation; and b) supplying said remote object source with a source information object and source communications protocols specifying source functions of the automated object transport operation, said source communications protocol being co-operative with the user communications protocol to effect said information object transport operation;

whereby said transport operation can proceed automatically after initiation at said user's station.

The inventive distribution software module and the original information product are linked together to interact seamlessly. It is possible for transport of the update to proceed in a high level format facilitating integration of the update object with the original product, and the invention also provides methods and software for effecting such integration.

A broad objective of the invention which can be fulfilled by the methods and products disclosed herein is to allow a computer user to fetch and use an information product update, or even an original information product for which they have previously received a transporter kit, with a minimum of effort, and preferably with the impression that the fetch function is an integral capability of the information product itself, rather than being executed by a separate or separable component.

Another objective is to enable information transport to be easily effected across any of a selection of media or carriers, desired by the containing information product supplier. To this end the information transport component can provide protocol selection means for selecting media for real time communication between said user and said remote object source employing a selection from a set of open-ended network technologies and network providers, said communication means being selectable without substantive change to said containing information product.

In preferred embodiments, after setup of a containing information product and a simple menu-selection activation of a transport operation to occur immediately or at a subsequent date, or time, and subject to the occurrence of error conditions, the information transport component effects the transport operation in an unattended manner, or without user intervention, through the steps of modem activation, dialing, network transit, handshaking with the object source, file specification, file importation, termination of the call and return of control to the containing product.

Preferably, additional transport-ralated steps such as sending back verification of receipt of the fetched file to the object source, inspection of the fetched object and comparison with a pre-existing manifest for verification of object parameters, and any necessary unpacking and decompression are effected automatically, in an unattended manner without user intervention. For seamless use of the object, it is also preferred that application file specifications, any necessary location or relocation of an object file or files, and any reindexing, index creation or other product integration function that is required to enable the user to utilize the fetched object harmoniously with the original information product, be performed automatically in unattended manner without user intervention, or with minimal user confirmation that one or more steps of the procedure should be executed.

Should errors be detected, if critical, they are reported to the user, and possibly also to the object source. If a detected error is potentially recoverable, the novel information transport component preferably takes action, without seeking user confirmation (although in some embodiments confirmation could be requested), to correct the error, for example by redialling a phone call a specified number of times, or by re-running an object fetch operation. Should a new fetch object still fail to meet manifest specifications, deviations may be reported back to the object source with the user being alerted and, possibly recommended to make a phone call.

Preferably also, the information transport component or "transporter" performs a containerized, standard transport operation, which is transparent to any high-level formatting of the transported information object, and standard in the sense that the transport operation can be essentially repeated for a wide variety of different information objects.

Preferred embodiments of the information transport component can pack or unpack, compress or decompress, and send to or fetch files from specified locations. The transporter allows the containing information product to be set up automatically to effect high-level integration of indexes and navigational structures by letting the containing product have control when needed to import or export (and encrypt or decrypt) objects.

Preferably, the transporter has no direct effect on the content of the data object. Such transparency is advantageous in avoiding interdependency between the transporter and possible use of novel data structures, encryption or copy-control methods, or the like, by the containing product. For example the transporter need not know (and possibly jeopardize) any encryption technique.

In preferred embodiments of the invention, the module is self configuring and has the ability to scan the user's system, and preferably identifies the user's modem, or other system components or configuration software, and automatically set protocols such as the baud rate, bits parity and the like. Relevant auto-configuring capabilities and software that may be employed in practicing the invention are offered or promised by Intel Corporation in a brochure entitled "Intel Technology Briefing: Plug and Play" copyrighted 1994, the disclosure of which is hereby incorporated herein by reference thereto.

Preferably, the novel electronic information transporter is seamlessly embedded in the containing product so that an end user is unaware that the transporter can exist separately from the containing product. However, it is a valuable feature of the invention that the transporter be separable from the containing product to be us able with other containing products.

New or improved electronic information products are made possible by the novel information transporter disclosed herein, for example, CD-ROM-based products updated from online services, updatable periodical magazine collections, catalog-based computer shopping with order entry and optionally, order confirmation.

Recently Contemplated CD-ROM Products Updatable from Online Services

A CD-ROM-based product with online service updatability called "MICROSOFT Complete Baseball"

(MICROSOFT is a trademark) was announced by Microsoft Corporation apparently on Mar. 1, 1994, with a Jun. 15, 1994 availability date. A product brochure received by the present inventor on April 26 describes a multimedia history of baseball which can be updated with daily scores from an online service, by modem. Nothing in the s ales materials suggests any separable information transport components marketable for use with other information products.

In late April 1994, CompuServe® (trademark) online information service announced plans for a CD-ROM information product to be used in conjunction with its online service. The CompuServe® CD-ROM information product online service is usable only with that service, and requires users of its online component to be CompuServe® member/subscribers, on terms such as described above, which terms restrict the CD-ROM product's marketability. The CD-ROM content and user interface is limited to that provided by CompuServe®. Accordingly, such a dedicated CD-ROM service is not a satisfactory solution to independent publishers looking for economical update means, because they will be limited to whatever user interface and data management flexibility the online vendor may provide which will substantially restrict any creative look-and-feel identity the publisher may have provided in their own product. Thus the CD-ROM product is described by CompuServe® in the statement: "It is, essentially, a new window on CompuServe . . . " This product description does not suggest an ability to obtain updated online information for integrated local, offline use with an original information product stored on the CD-ROM, as is provided by the present invention.

In addition to CD-ROM-based products, various new information distribution methods and services are made possible by embodiments of the present invention. The object source can be a remote server equipped with a cooperative communications module closely molded to work effortlessly with the information transporter for distributing objects to a wide base of users. Such a remote server can be linked to a vendor or gatewayed to other information object sources or electronic publishers, and exploit its smooth and efficient information transport capabilities to act as a distribution point for such vendors, sources or publishers.

Thus, the invention further comprises such a special-purpose server designed for use with the novel information transporter and the special-purpose server can be established as a distribution service for publishers who incorporate the information transporter in their products. The invention also provides a method of operating a server to provide such a software service and server-enabling software.

BRIEF DESCRIPTION OF THE DRAWINGS

One way of carrying out the invention is described in detail below with reference to drawings which illustrate only one specific embodiment of the invention and in which.

DETAILED DESCRIPTION OF THE PREFERRED EMBODIMENTS

Figure 1:
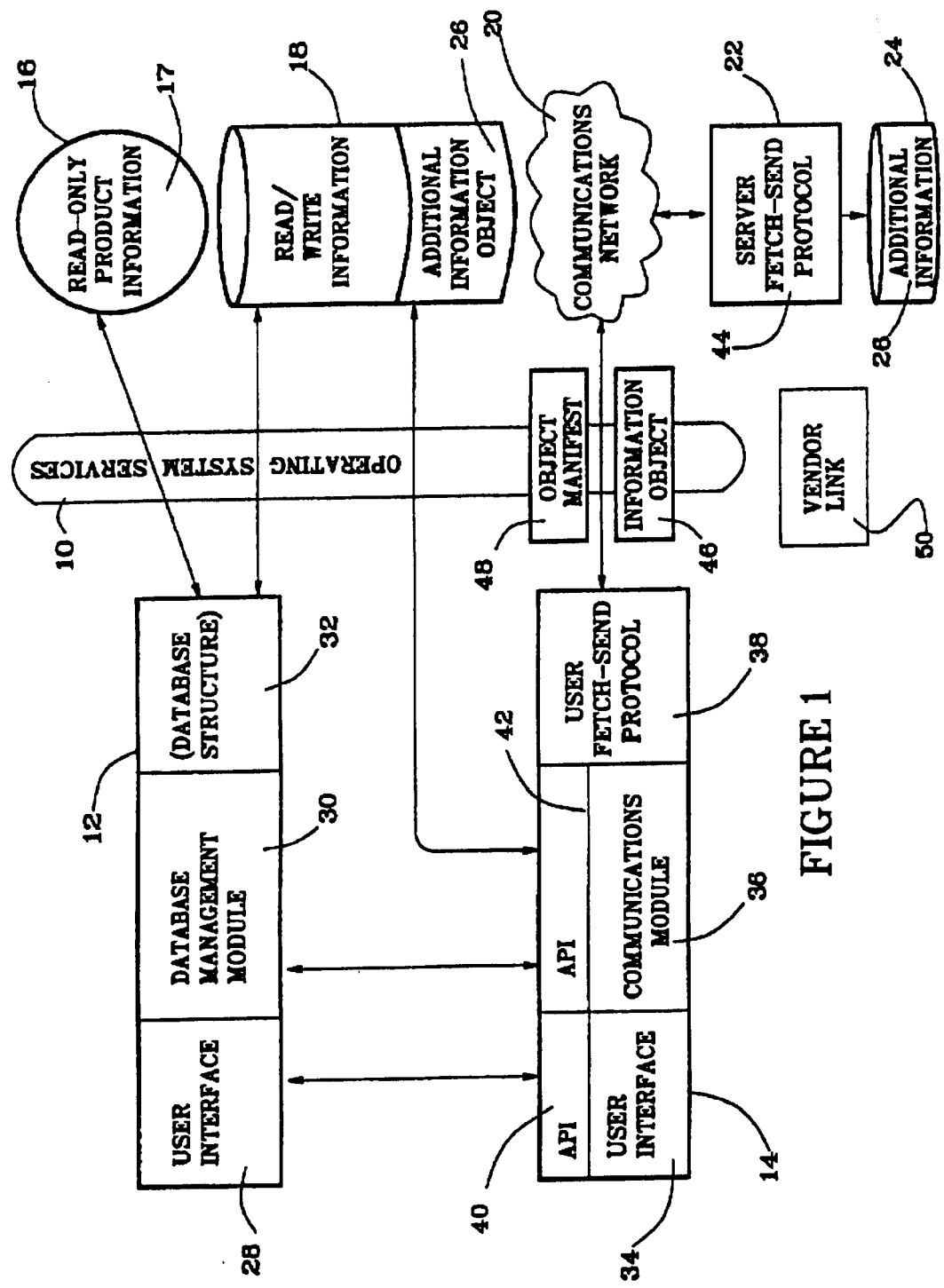
FIG. 1 is a schematic diagram of one embodiment of an information transport software component according to the invention installed in a computer workstation and communicating with a complementary centrally located server-resident software module for mass distribution of digitized electronic information objects.

Referring to FIG. 1, the inventive software component is schematically shown in operative mode installed at a user's computer workstation. The workstation is communications-equipped for communication with remote services, for example by modem, which services are also shown schematically. Only relevant software and hardware components of the system are shown.

Relevant components at the workstation comprise operating system services 10, a containing information product 12, an information transport component or module 14, herein also referenced as a "transporter" which may be a stand-alone product or, in preferred embodiments is embedded or contained in the containing information product 12. Information transport component 14 provides a general purpose facility for sending and fetching information objects between an end user's computer (the client) and a central server. Information transport component 14 is not customized to the containing information product 12, but is intended to be used in conjunction with any of a wide range of electronic information products.

Operating system services 10 provide capabilities for the containing information product 12 and the information transport component 14 to access a readable information storage device 16 which may, for example, be an optical disk drive such as a read-only CD-ROM where product information 17 is stored. In addition, a read/write information storage device 18, for example, a conventional hard disk is accessed via the operating system services 10 for storage of a fetched additional information object 26. The storage media used for hard disks and the like are often described as nonvolatile and the type of storage is frequently referenced as "permanent". However, the more recently used term "persistent storage" which references the manner of storage as well as the physical storage media and distinguishes from transient storage where objects may be automatically erased after some interval, or event, without supervisory control or awareness of the erasure, is a more suitable descriptive term for the purposes of the present invention.

As necessary, different, or modified, information transporter components 14 can be supplied for users of different operating systems or system families, notably DOS (available in several versions, for example from Microsoft Corp, IBM Corporation, Novell, Inc.) Windows (trademark, Microsoft Corp.), Apple Computer Corp.'s operating systems, possibly IBM Corporation's OS/2 (trademark), and any distinct operating systems developed for personal digital assistants, pen-based computers and the like.

Information transport component 14 also uses operating system services 10 for external communication with a communications network 20 through which the information transport component 14 can access a remote server 22, or server-client network, supporting a data storage device 24 where desired additional information object 26 is located.

Communications network 20 can be any electronic distribution system suitable for transporting information objects 26 including wired and wireless common carriers such as telephone networks, cable television systems or networks and mobile telecommunications or data communications networks and extends also to emerging and future systems of providing electronic communication between users of diversified equipment. The term "common carrier" is used herein to embrace all such data communication systems as will reasonably meet the purposes of the invention. The term "modem" is used herein to embrace any network interface device enabling a user station to communicate on such a communications network 20.

While the containing information product 12 can take many different forms, as described herein, and as will also be apparent to those skilled in the art, a preferred embodiment is that of a periodically issuing publication or publications, for example, a news magazine or a collection of patents. Again, the additional information object 26 could be any information of interest to the user, having some relevance to the containing information product 12, but the invention and its unique capabilities enable the additional information object 24 to be fully integrated with the containing product 12 in a manner that can be automated to be transparent to the user.

The inventive information transport component 14 is designed to require a minimum of user input. A bare minimum will be a user's ID which can be entered by the user in a product setup and automatically accessed for information transport, or could by pre-loaded by the vendor from data supplied by the user at purchase.

A product ID is preferably pre-loaded into the containing information product 12 by the information product vendor or publisher to be available for use by the information transport component 14. However, even this may not be required. In an alternative embodiment, the product ID can be automatically incorporated into the product in a product replication process that permits individualized coding of unique ID's. In most cases, a user-actuated menu selection is provided in the containing information product 12 after integration with the inventive information transport component 14 to activate transport of an additional information object, and preferably, selection of transport activation drops down a menu of transport choices such as "FETCH UPDATE", "FETCH CATALOG OF UPDATES", "SEND DATA" and the like, each of which then runs automatically upon selection.

Updating can also be totally automatic, and other than an obviously desirable user notification, be completely invisible to or transparent to the user, running in background on their system, while the user's screen is available for other processing such as running the containing information product 12. Where updates are made available on a known schedule, a totally automated product can be provided that fetches an update without any user intervention, on the specified release date, or as soon thereafter as the user's system, or the containing information product 12, is activated. In practice, most users will probably prefer an opportunity to confirm that the fetch transaction should proceed. A preferred embodiment monitors the user's system clock and alerts a user to the arrival of an update release date and asks the user to confirm that the system should seek and fetch the scheduled update, if available.

Thus, the invention is particularly suitable for importing updates of information or information processing products, such as periodically issuing literature, or software upgrades. Accordingly, additional information object 24 preferably comprises updates which can be integrated with the information product 12 to provide, for example, a coherent body or continuous sequence of materials that can be commonly searched and indexed preferably in a manner giving the user the appearance of a common logical file formed from physically distinct files. The appearance of integration can be achieved by searching new and then old indexes in series and making the search and navigation logic of the containing product smart enough to combine new and old information. For example a new object can have an index file similar to that for the original information product 12. A search engine can first search the new index, then the old one, and then produce a combined set of results. Preferably, the files are not actually merged or otherwise combined as to do so could be unduly complex.

As shown in FIG. 1, the containing information product 12 comprises a user interface 28 enabling the user to view, search, excerpt and print or otherwise export or process selected information items from product information 17. The user interface 28 provides standard information product features, as conventionally supplied by the product publisher, supplemented by appropriate fetch or send options to activate the features of the inventive information transport component 14.

Also shown in FIG. 1 are a database management module 30 and a data structure definition module 32. Database management module 30 provides retrieval-oriented database processing of the information product including indexed searching and selective retrieval capabilities using one or more index keys such as an issue or item number, or full text searching, and may provide hypertext and hypermedia linkages. The data structure definition 32 provides the database structure of relevant files as classified by field or element, name, type, size and the like. After successful completion of a fetch operation, control is returned to containing information product 12 to process the new information in essentially the same manner as the original information, or in any other manner for which it has been equipped.

Major modules comprised in the inventive information transport component 14 are a user interface 34, a communications module 36 and fetch-send protocol 38. In addition, the information transport component 14 preferably comprises its own built-in application programming interfaces (APIs) such as a user interface API 40 and a communications API 42, enabling the information transport component 14's user interface and communications modules respectively, readily to be incorporated with, or plugged into a wide range of containing information products 14. Such incorporation, in the currently best known embodiment of the invention, is effected by software engineers familiar with and having access to the containing information product 12, but future developments may enable the incorporation process to be effected by skilled users.

References herein to an applications programming interface (API) will be understood to embrace any program interconnection technique which supports direct, seamless interaction between one program and another, including procedural calls, object encapsulation, or emerging techniques like Microsoft Corp.'s Object Linking and Embedding (OLE) or Apple Computer's Open Doc.

API 40 is responsible for providing means for the user to interact with the information transport functions of the invention and interface as seen by the user and API 42 is responsible for handling internal processes of communications and data management.

The APIs 40 and 42 are intended to enable the information transport component 14 to be used by a range of product programs controlling a variety of information products and to enable each API 40 and 42 to be free to exercise flexibility and creativity in extending its associated user interface 28, data management module 30 and database structure 32 to fully address the provision of transport functions for the purposes described herein.

API 42 operates on a transport function level involving high level interactions between the containing product 12 (or the optional user interface) and the transporter 14 before and after communications while the detailed low-level interactions between the transporter client and the server during communications are handled by fetch-send protocol 38, without involvement of the containing product 12 or the user. "High level" is used to refer to a level at which software interacts with a user, typically in simple, readily comprehensible, function-oriented, graphic or everyday language terms, while "low-level" refers to a level of detailed procedural interaction with an operating system, or device (modem, port etc.) in obscure program or machine language terms incomprehensible to most users.

Fetch-send protocol 38 is, in the preferred embodiment shown, a component of a novel client-server communications procedure designed to manage the transaction-oriented transmissions required to achieve satisfactory transport of desired server stored information objects, and optionally, central reporting of user information in a predetermined format. Alternatively, one or more existing protocols could be used.

Preferably, the API's 40 and 42 and the fetch-send protocol 38 are structured to use a manifest list to control the exchange of information objects. The manifest list can be provided in fetch-send protocol 38, and can be forwarded to remote server 22 to provide better efficiency, error control, and management of the operation. Alternatively the manifest list may remain resident at the user's station. The manifest is valuable operating at the client station, at the API level, to specify the actions required during a transport session and can in one embodiment comprise a list of send and fetch operations which are individually controlled.

This software mechanism, employing novel communications procedures and applications interfaces that reference an object manifest, provides a new way for performing a wide variety of information exchange functions in a simple, standardized and economical manner.

API Functions: 1) Product Setup

In preferred embodiments, API 40 and API 42 include a product setup routine of an application-specific configuration, which is used by the publisher or product developer, prior to publication, to establish seamless compatibility between the containing information product 12 and the information transport component 14 for smooth execution of desired transport functions. A completion status code is also specified.

The application-specific configuration posts user and product ID information, as needed to process password or other access code authentication and posts files information, including designation of an application work directory and a transporter work directory for performing the transporter functions of information transport component 14.

Additionally, the application-specific configuration sets up an appropriate decompression (or compression for send objects) technique according to the expected format and condition of fetched information objects 46, which information is pre-coded into communications component 36.

The application-specific configuration established through API 40 selects either a standard user interface, as furnished with information transport component 14, or an application-controlled user interface. Control settings are established for connection problem handling, disk error handling, abort and server condition handling, access denial, unavailability of information object files and any other error situations which may occur during transport.

If desired, optional, advanced controls for scheduled automatic calling can be included in the application-specific configuration used in preparing the containing information product 12 for publication.

Preparation of containing information product 12 and incorporation of information transport component 14 therein, with an application specific configuration, as described is carried out prior to publication to build a customized, ready to run version of the product with automated update capability.

Communications API 42 establishes a product-specific transport method choice list for selection of an appropriate file transfer protocol as between direct dial, data network dial, and other modes of transport. Communications protocols specify necessary connection parameters such as access number and network addressing or other routing information. Optional script choices can provide for different modes of transport.

These product-specific configurations and protocols enable information transport component 14 to be packaged in executable form with containing information product 12, with all necessary product-specific components and settings, including a standard user interface if selected, ready for inclusion in the product package.

If desired, at the option of the information product publisher, a standard user interface may be included. Such an optional standard user interface can have all facilities needed to select transportable objects from a predefined list, perform all user setup functions, and invoke information object transport.

Additional options are standard software that would allow the user to search, view and print the transported objects totally independently of the user interface and database search components of the containing product. Both such options enable a publisher to exploit the inventive transport product for efficiently and economically providing updates without having to make changes to the publisher's containing product, simply by configuring the transporter or information transport component 14 and physically including it, and the optional components, within the containing product.

A standard viewer might handle only ASCII text, but it preferably could provide for other useful formats such as standard word processor, spreadsheet or database formats, or multimedia formats such as video, sound and HTML (hypertext markup language), a format becoming popular on the Internet and which provides the ubiquitous Web pages for the Internet's World Wide Web.

API Functions: 2) User Setup

Compatibility with the user's system is effected by API 40 establishing a user-specific configuration, and creating or updating the necessary control files.

Parameters established in the user-specific configuration include a setup ID number to permit use of multiple setups, for example, for different transport options, and a product ID number.

The user-specific configuration posts user ID information and a password or other access code authentication and posts files information, including disk and drive designation for work and data directories. Autocall options and a completion status code are also specified.

API 40 provides information for communications module 36, specifying a user communications protocol for the user's hardware, operating system, line configuration, and so on. Thus, for a standard telephone connection, comport, speed (baud rate), interrupt settings, modem type and control strings, dial prefix, dial 9, pulse or tone, call waiting shut-off, and the like are specified, as appropriate. Additionally, the user communications protocol includes access number and connection parameters, optionally with script selection for routing choices via data networks, and so on.

The resultant user-specific configuration and communications protocols generated through API 40 create a setup ready to call and places it in the designated transporter work area.

A validation procedure checks entries and reports obvious errors in parameter settings.

Preferably, multiple product ID setups are provided to enable multiple information products to use the transporter with an appropriate, compatible transporter version. Preferably also, the user-specific configuration accommodates shared use of the transporter work areas by multiple information product applications resident on the same user's system.

Mechanism of Fetch-send Protocols 38 (user) and 44 (server)

User fetch-send protocol 38 working in cooperation with server fetch-send protocol 44 controls the desired information object transport function, calling remote server 22 and exchanging data objects. It performs or supervises communications between the user's system and remote server 22.

Communications module 36 uses a setup ID number specified through API 40 or 42, selects which setup to use for a call, calls remote server 22 using protocol 38, and in a preferred embodiment, sends an object manifest comprising a send object list, a fetch object list or both. Such manifest is created under control of user interface 28 from a pre-existing set of choices supplied with the product or obtained during previous update operations, or both.

Alternatively fetch-send protocol 38 may refer to a pre-existing manifest list stored at the user's station, or may be directed by remote server 22 to select one of multiple pre-existing manifest lists stored at the user's station. As another alternative, although it is convenient and advantageous to transmit the manifest list to the server 22, the relevant status and management information can simply be used locally by communications module 36 and be integrated into the individual fetch and send protocols.

A send object list comprises object action codes specifying the type of server action required, if any, object names, object sizes and response object size, if any. A fetch object list comprises object names, object sizes and an object availability date.

A completed object manifest is employed to convey the status of the transport operation and to provide for additional information transport, if desired. The completed object manifest adds the following to the request object manifest: send object additional information; object acceptance codes returned by server 22; time of acceptance; and a response object name, if called for by the object action code.

For a fetch operation, the completed object manifest adds the following to the request object manifest: fetch object additional information; a fetch confirmation or failure code; the time of completion or failure and a revised availability date if the requested fetch object was unavailable.

If a scheduled update or polling option is present and selected, a scheduling or polling indicator is included, and a completion of processing or import function to call through API 42 is specified.

A completion status code terminates the fetch or send operation and returns control to the information product application or the provided user interface.

Information Transport using Communications Module 36

Communications module 36 employing the described fetch-send mechanism comprised by cooperating protocols 38 and 44 performs the functions necessary to complete an information transport operation, as described herein, under a variety of circumstances, with tolerance for a common range of error conditions, open drives, inadequate disk space, lost line connections and the like, without losing control of the user's system. Using correct, verified ID, naming and routing information, the information transport operation employing the inventive information transport component 14 is less error-prone than many computer users would be were they effecting the transport operation with conventional technology requiring them to enter routing and storage information and the like, manually.

Communications module 36 verifies that all send objects are as specified, that all fetch objects are scheduled to be available, verifies that sufficient disk space is available for all fetch objects and for compressed transmission copies of all objects, and returns an error report if any of these requirements is not fulfilled.

Communications module 36 performs communications, then returns a completed object manifest, and logs all activity in a transporter log file. If an optional scheduling/polling feature is selected, the communication is deferred until the scheduled time.

These general objectives are achieved by carrying out the following process steps after an application (or optionally a transporter user interface) requests a transport function:

1) Local validation of the request returning a failure code if the request is improperly specified.

2) Compression of all send objects for transmission and placing them in the designated transporter work area.

3) Connection attempts to remote server 22, returning a failure code if necessary. Connections are made via phone line or network. The system handshakes and identifies the call to the server.

4) Presentation of the object manifest, if utilized, for validation and action.

5) on receiving a go-ahead, transport of each send object, logging each as sent, and receipt of object acceptance codes from the server and logs them, when received.

6) Receipt of all fetch objects from the server, placing them in the transporter work area, and logs them as received. Fetch object names may be precise, or generic or alias names may be used to request a latest installment.

7) Receipt and logging of a completed object manifest from the server. (If receipt of response objects is implied by the action codes, first receives a revised object manifest, and fetches the response objects, then receives the completed object manifest.)

8) Disconnection from server.

9) Decompression and unpacking of all fetch objects into application work area, and logs completion status.

10) Returns control to the application (or optional transporter user interface).

The product checks the completion code, and completed object manifest to deal with any error conditions. The application performs any required import processing on fetched objects to integrate the data and indexes with prior data, as desired, to enable seamless use. If desired, import processing can include, or offer as a user selection, file maintenance functions relevant to the information product including, for example, file purging to remove obsolete information files and preserve the user's storage space. Specifications of files to be deleted can be included with the original product or with a fetch object. In either event the responsibility for accurate specification is passed to the vendor, relieving the user of the risk of making erroneous deletions and anxiety attendant thereon. After such import processing the containing information product (or the optional separate user interface) then returns control to the user for use of the received data.

Those skilled in the art will appreciate that the identification of files in the object manifest, or for file maintenance functions at the user station, or for any other purpose of the invention, can be effected generically, for example by using wild card characters, as is customary in file specification, and which effectively permits multiple objects to be specified as a class related by file name characteristics, or related individually, thereby providing options for specifying transport of such class of multiple objects to proceed at one time or in a series of transports over time. Other algebraical identification methods can be used which may reference object versions in series or comparable characteristics.

Figure 2:
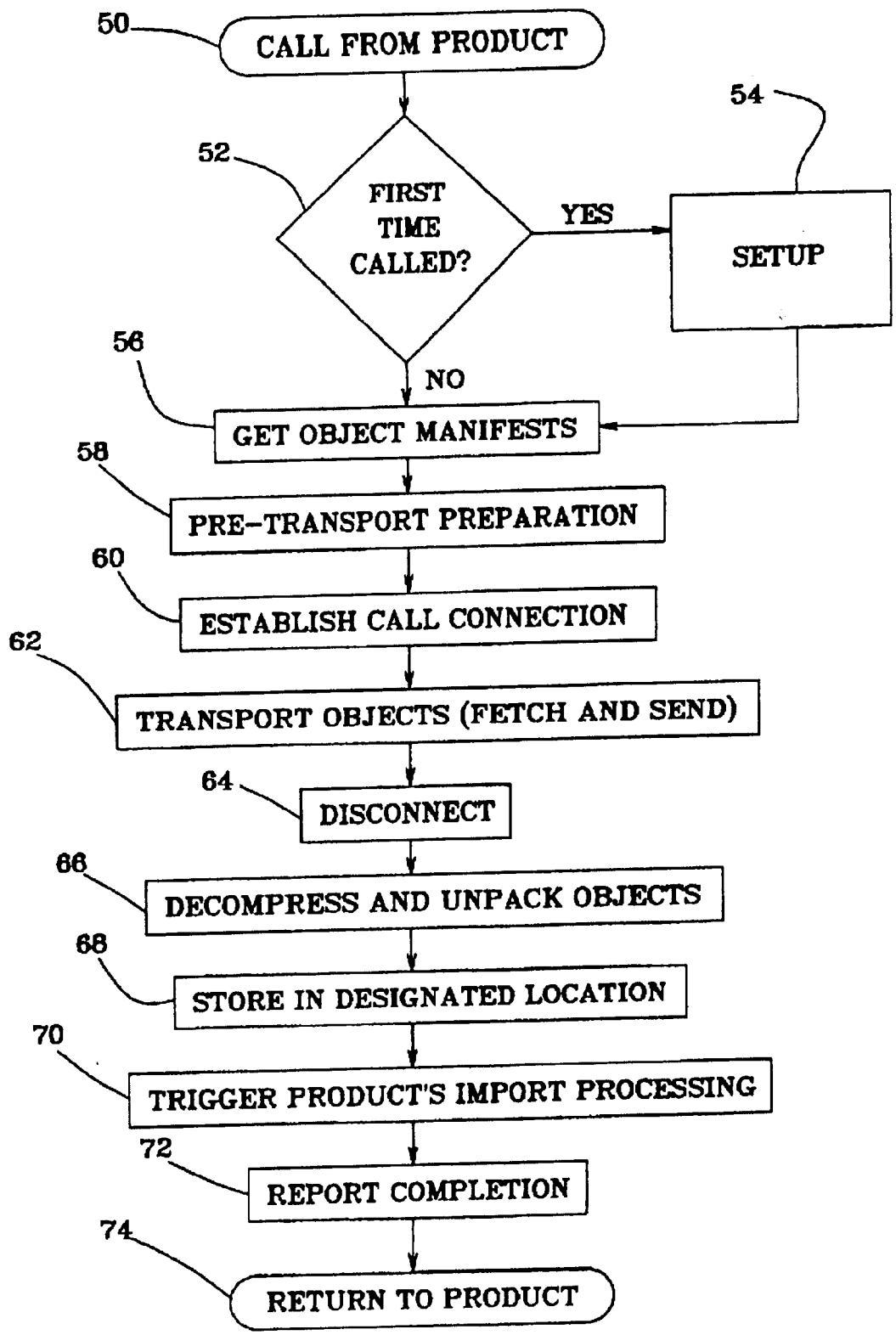
FIG. 2 is a flow block diagram of an information transport operation performed by the software component and module of the embodiment of FIG. 1.

The foregoing steps are illustrated in the flow block diagram of FIG. 2. When containing information product 12 issues an information transport call 50, setup filter 52 runs setup routine 54 if this is a first call and no information transport setup was run on installation of containing information product 12. At block 56, an object manifest is retrieved for pre-transport preparation at block 58. After prepping, a call to server 22 is established at block 60 and when the connection is made, and a handshake performed, one or more objects is transported at block 62.

After completion of transport and receipt of a completion manifest, server 22 is disconnected at block 64, received objects are decompressed and unpacked at block 66 and stored in a designated disk storage location at block 68. Object storage triggers containing information product 12's import processing to assimilate the information update with the original information product at block 70, following which a completion report is issued at 72 and control is returned to the containing information product 12 at 74.

Optional Schedule Function

An optional transport function module for scheduled or poll-responsive information object transport can be provided to defer the fetching of an update or to defer another information transport operation to a specified later time, or until called by the server.

The optional transport function schedules a request, waits, then automatically performs the transport operation at the scheduled time. In polling mode, it activates (and, if necessary, interrupts and then reactivates) the user station's ability to receive calls.

Mechanics of the optional transport function include a request for an ID number, an indicator for calling or polling mode and a schedule iterating a call time, a retry protocol, call activation and timing, along with an authentication procedure for the server and a completion status code.

Client-Server Communications Protocol

Communications between the information transport component 14, functioning as a client, and the server 22 follow a predefined communications procedure having cooperative user components comprising user fetch-send protocol 38 and server fetch-send protocol 44.

Server-client intercommunication can be broken down into five steps, a) login, b) manifest transmission, c) send operation, d) fetch operation and e) logout, as described in more detail below.

a) Login

Login establishes a session with an authorized client. A handshake process between user protocol 38 and server protocol 44 identifies the user's transporter client system to remote server 22 by product ID and user ID, and a password or other authentication code. A failure reason code is given to rejected clients.

b) Manifest Transmission

Preferably, via user protocol 38, the user system issues an information object transport request manifest to server 22. Server 22 verifies its ability to meet the request by returning a manifest acknowledgment specifying which elements will be processed and provides reason codes for declined elements. Alternatively, as stated previously, manifest functions can be listed in individual send and fetch protocols.

c) Send Operation

If the user system outputs a send object, through information transport component 14 and protocol 38, server 22 receives and accepts the send objects and stores them, identified by product ID and user ID. Error control and retry mechanisms are employed and successful receipt of the send object is acknowledged and logged.

If the action code calls for a response object, the server obtains necessary processing from a pre-designated external source (corresponding to the product ID and action code) and returns the response as a fetch object, called a response object.

d) Fetch Operation

The server obtains requested fetch objects by product ID and object name and forwards them to the transporter at the user. Error control and retry mechanisms are employed and successful transmissions are acknowledged and logged.

e) Logout

The server transmits the completed object manifest to the transporter, confirms and logs receipt, and ends the session.

The Inventive Transporter Compared with a Conventional Communications Product

Figure 5:
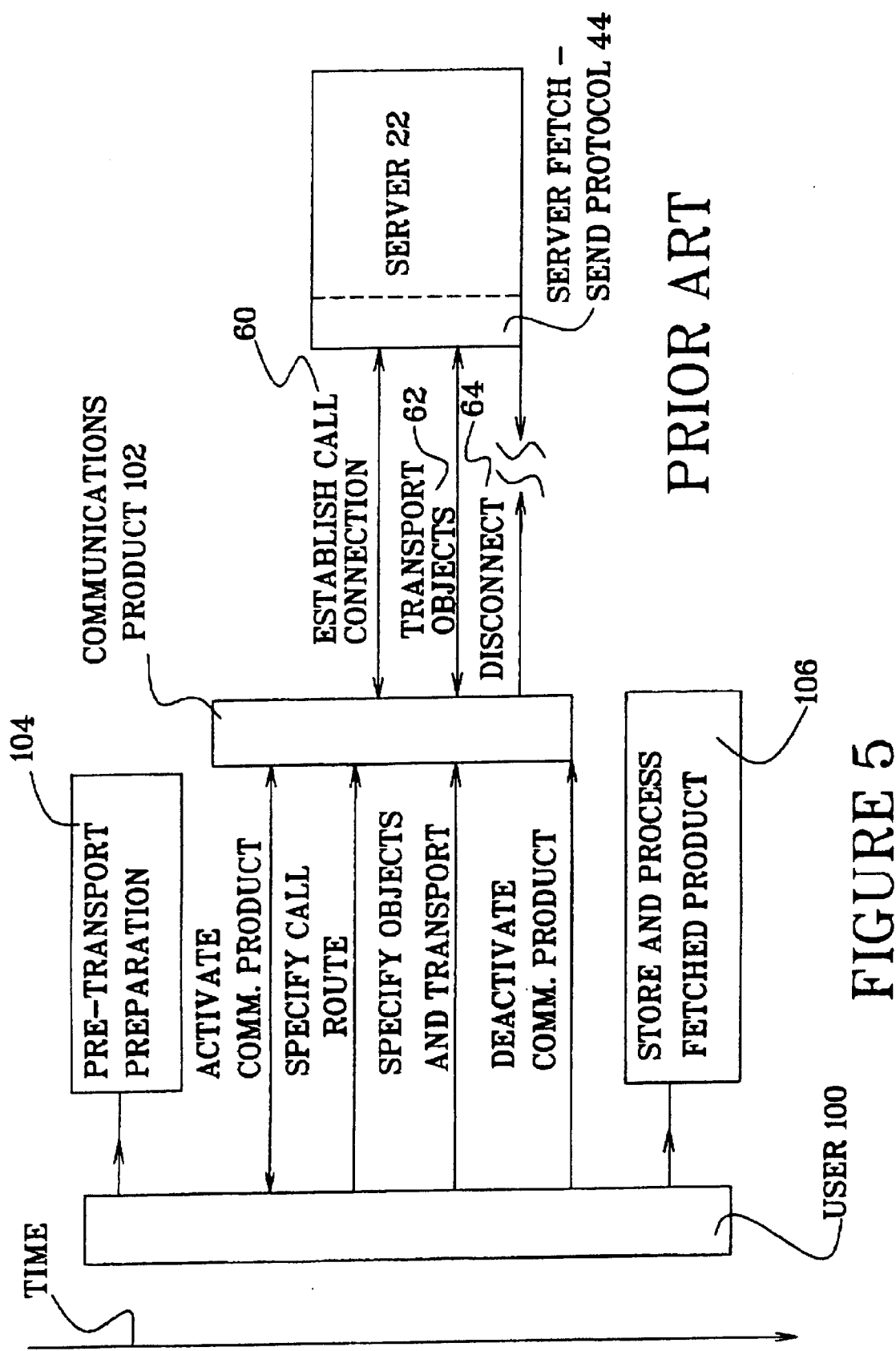
FIG. 5 is a schematic diagram of a prior art communications product employed to transport an information object between a user and a remote server.
Figure 6:
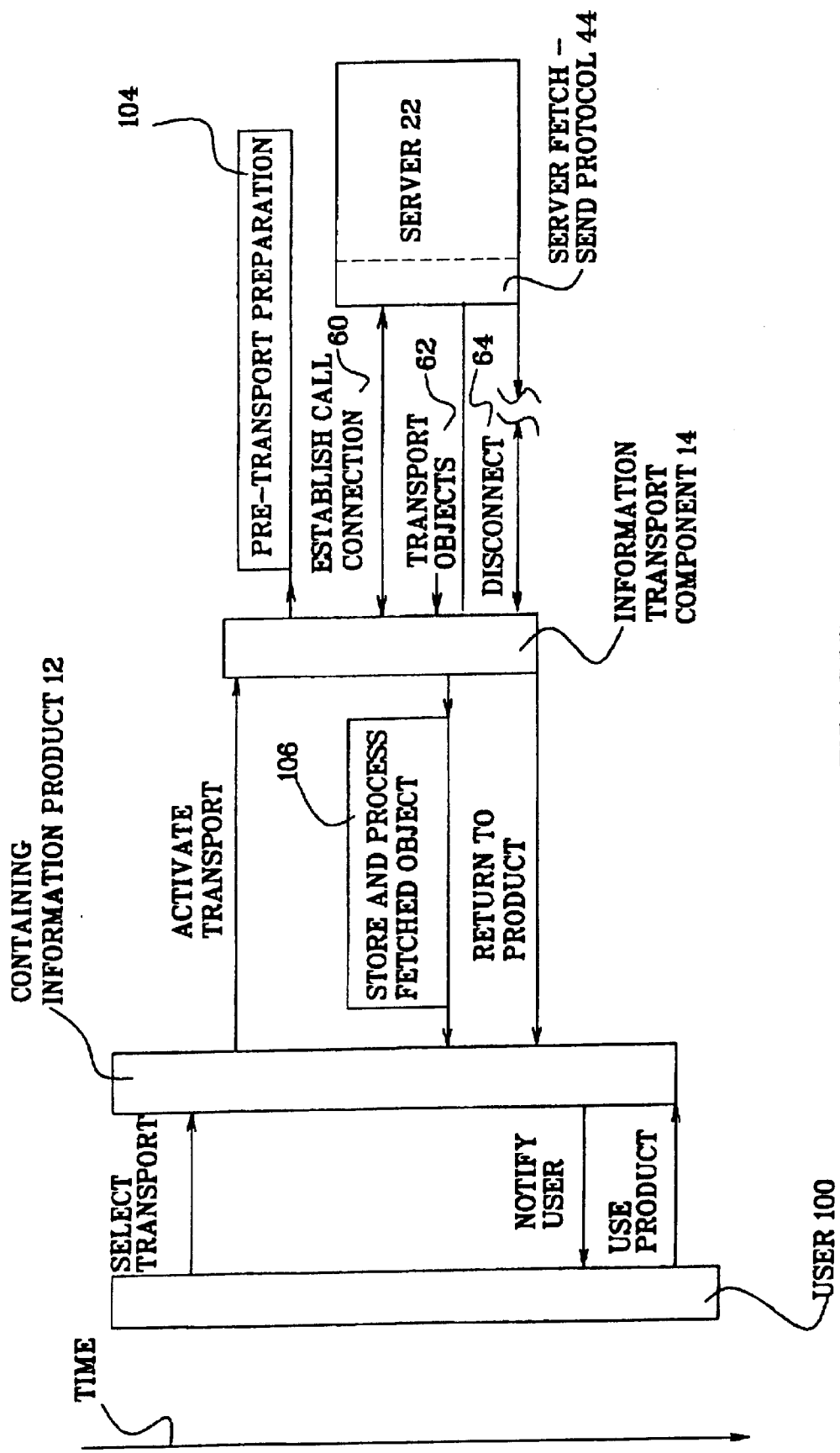
FIG. 6 is a schematic diagram s similar to FIG. 5 showing, in a comparative manner, some of the benefits that can flow to a user when an information transport software component, such as that described with reference to FIG. 1, is used for a similar transport operation.

FIGS. 5 and 6 illustrate schematically the simplicity and ease- of-use benefits the invention provides FIG. 6 to a user 100 in fetching an information object from a remote server 22 as compared with the use of a conventional communications product (FIG. 5), such, for example, as CENTRAL POINT COMMUTE (trademark) or PROCOM (trademark).

In the prior art embodiment of FIG. 5, many operations require active participation by the user who, for example, must at least initiate any pre-transport preparation 104 of the information object, such as checking the specifications, checking work space available to store a fetched object and conducting any other preliminary checks. The user has to activate a communications product 102, specify a call route, and after the call connection is established, specify the objects and initiate a transport operation. Communications product 102, operating in a cooperative manner with remote server 22, will execute establish call connection 60 after the call route (phone number) has been specified and will execute transport objects 62 after the objects to be transported are specified by the user. Disconnection 64 is usually effected by a user executing a call termination command, which if the user is inattentive, or inefficient, may be delayed longer than necessary to complete the transport operation, running up unnecessary line or air time charges.

After completion of the transport operations, user 100 has to deactivate the communications product 102 and then initiate any required storing and processing of the fetched product 106. While some of these steps may be automated via one or more batch files, scripts or macros, a vendor of a containing information product 12 has great difficulty in furnishing such a batch file or macro for a mass market distribution because of the different systems and communications products encountered in a mass market, which systems and products have a variety of different specifications, performance characteristics and unique, incompatible scripting languages.

Equally, while some more skilled users 100 might be able to write their own batch files without undue difficulty to automate some of these steps. Many users will lack the ability or the inclination to do so. Also the effort would not be justified for a single transport operation. Nor is the result of such efforts likely to match the ease and simplicity of the results achieved by the present invention which enables even a first update to be obtained effortlessly with the software running in unattended mode, after initiation.

FIG. 6 clearly shows how the inventive information transport component 14 relieves user 100 of many tedious communication functions such as activating a communications product, specifying a call route, specifying the objects to be transported and deactivating the communications product. In addition, preferred embodiments of the invention also relieve the user of optional pre-transport preparation 104 and execution of store-and-process-fetched-product 106 if these functions are appropriate to the containing information product.

Referring to FIG. 6, user 100 selects a transport operation from a user interface screen in containing information product 12, whereupon the latter calls information transport component 14 to activate transport. Information transport component 14 implements any necessary pre-transport preparation 104 and then, employing its own communications module 36, and server fetch-send protocol 44, proceeds in unattended mode, without requiring user intervention to establish call connection 60, to execute transport object 62 and automatically perform a disconnect 64, as described herein.

Automatic transport control and disconnection is a useful feature of the invention providing economy of line or air time charges and reducing congestion on the communications carrier. Using conventional communications products, (especially with online services) the duration of the connection may be unnecessarily extended by the delays and potential errors inherent in user control, resulting in increased communications costs and failures. The inventive transporter 14 provides software control of the connection duration, enabling it to be confined to a period sufficient to effect said unattended object transfer, enhancing efficient use of the communications medium.

Also as described, the operation can be monitored or controlled by employing an object manifest and is facilitated by the use of pre-specified addresses and transport characteristics. After satisfactorily completing the transport, the information transport component 14 automatically deactivates and returns control to containing information product 12, preferably with a satisfactory completion report which containing information product 12 notifies to user 100 through the containing information product 125 user interface.

If the transport object 62 was a product update, optionally a store-and-process-of-fetched-object 106 is initiated by information transport component 14 and execution of the store and process operation may be passed to the containing information product 12. The user can now use the updated product.

As FIG. 6 shows, when read, in comparison with FIG. 5, the invention enables a user 100 to be relieved of all duties save for minimal selection and notification functions, while no complex added functionality is demanded of containing information product 12. Optional store-and-process-or-fetched-object 106 is contemplated as requiring only minimal modification of existing containing information product 12 functions while other more complex procedural and detailed transport related functions are handled by the information transport component 14.

Some non-limiting examples illustrative of practical commercial and industrial applications of the invention will now be described.

EXAMPLE 1

A News Magazine Distributed on CD-ROM

Some weekly news magazines offer subscriptions to a quarterly CD-ROM which contains multimedia material plus a searchable full- text database of the most recent quarter's weekly magazine issues and enabling application software. Newer issues are not provided until the next quarterly disc is mailed. Accordingly the CDROM electronic magazine product steadily becomes out of date and its value lessens.

The invention incorporates an information transport component 14 with a news magazine product stored on a CD-ROM 16, to enable a user to fetch an information object 46 in the form of new issues (and their associated search indexes) from a remote server 22, as they become available, for example weekly. The fetched updates are stored on a consumer's computer hard disk storage device 24. Because of the size of rich content multimedia files, the updates are limited to text material including full texts of interim issues and associated files such as indexes. Because it knows the storage location of the updates, the next CD-ROM issue can include, as an install option, or upon first access, a request to delete the old now-outdated updates from hard disk 24, creating space for new updates.

User interface 28 in conjunction with user interface 34 contains code providing a menu selection enabling a user to activate the update fetch operation and then to provide integrated or seamless access to the combined data, searching both the hard disk storage device 24 and the CD, using both sets of indexes, so that the contents are viewable as a single collection, although an additional independent searching/viewing function for the updates could be provided, if desired.

A product setup routine adapts the information transport component 14 to work with the news magazine CD-ROM's existing software for creation of a user interface, searching and viewing. Communications options may be limited to direct telephone dial only. A simple user interface addition controls a setup process allowing the user to enter a unique user ID, provided with each copy of the CD-ROM distribution disk, and to create predetermined work areas on the user's hard disk.

A schedule of updates with names, dates, and files sizes is provided in the containing news magazine product on the CD-ROM and is accessed via user interface 28 in conjunction with user interface 34 to create a fetch object manifest 48.

Optionally, user interface 28 in conjunction with user interface 34 creates a send object manifest 48 to control transport of user demographics for market analysis or for renewals, or the like, in the opposite direction from the user to the server, with the send operation being triggered whenever the next transport operation is activated, or optionally, by allowing the user to trigger it.

A fetched information object 46, such as an update, is automatically decompressed and stored on hard disk storage device 18 as additional information object 26 for integration with the original CD-ROM product so that the user can view both the update and the original issues, and run searches across the entire collection.

Optionally, initial location of additional information object 26 may be an application work area location on storage device 18, and communications component 36 may be pre-set to pass control via API 42 to database management module 30 which will do further processing to integrate additional objects in accordance with the existing database structure 32 to provide a more complete level of integration permitting, for example, viewing of combined menus, nullification of obsoleted items, and cross-linking of hypertext elements.

If a send object has been prepared and included in the object manifest, such as a send object containing user information entered during the install process, or subscription request information obtained from the user, it is sent to server 22 to be stored and identified by product and user ID for appropriate action in due course. Acknowledgement of receipt of the send object is noted by communications component 36 and passed back to the user if such provision is made in user interface 28.

Both the fetch and send operations are closed ended in the sense of being operations that are pre-described in the original information product and once triggered, can be completed without human intervention of any kind.

To service the automated update facility running at the user's workstation, remote server 22 is set up to accept calls from valid user ID's, and is loaded with new issue text and index files, in the form of update information object 46, according to a publication schedule.

EXAMPLE 2

Open-ended Fetch of a Supplementary News Magazine Object

Open-ended access to supplemental information objects not described in the original information product can be obtained by providing in the original product means to fetch a directory of added features. This can be used, for example, by a news magazine publisher to provide special news features on an unplanned basis, or each weekly issue could be packaged with a directory of additional features available. The user first specifies a fetch of the new directory, or receives it along with a fetched update they have specified from a user interface menu, and then views the fetched additional features directory and initiates a fetch of a selected additional item or items in a second information object transport operation, using an information object manifest built from the new features directory.

The original, containing product news magazine CD-ROM user interface 28 preferably has provision for importing and viewing any information objects listed on a completed fetch manifest and delivered by the information transport component 14 into the designated work areas. Alternatively, a standard information transport component 14 user interface 34 can be used to provide this function in a less integrated form.

EXAMPLE 3

Retail Catalog on CD-ROM with Merchandise Order Entry at the Server

Multimedia product catalogs with 800 ordering numbers are now available on CD-ROM and also with pre-installed software packages on new computer hard disks. In this example, the multimedia (or text and graphic) product catalog is a read-only information product 17 which can be furnished with an information transport component 14 according to the invention, to facilitate order placement from such electronic product catalogs providing an easier order placing process than has heretofore been possible. Employing the inventive information transport component 14, a catalog vendor can enable a customer to place the order directly, via modem, without requiring a voice call and ensuing verbal product identification, by pointing and clicking a "Place Order" or "Mark for Order" button on the user's computer screen. The order is transported to remote server 22 using the novel information transport component 14. Preferably a verification routine is included, requiring order confirmation with a user-supplied password, and possibly keying of the total amount to prevent unauthorized or inadvertent product ordering, for example by children.

Order fulfillment is effected by processing of the information in due course after receipt by the remote server 22 and any additional information required centrally is collected during product setup and held locally for transmission with an order. For example, setup can capture the user's charge card information, shipping address, and the like and create a header for an electronic order form.

When the user clicks the "Mark Order" button, procedures supplied with the user interface 28, as modified through user interface API 40, add order item identification information to an electronic order form. When the user clicks the "Place Order" button, user interface 28 triggers a transport request to server 22, to include the order form as a send information object 46. Transport of the send object, including the order form, from the user's station to the server is executed employing an object manifest 48, as described herein.

If not located at a vendor's or merchant's premises, server 22 can forward received electronic orders to the merchant for fulfillment, at appropriate intervals, via a vendor link 50.

This simple, low cost mechanism for automated order placement, can complement telephone ordering but lacks the credit-checking and inventory status capabilities that are frequently provided by phone. However, such a catalog application could allow the user to request the fetching of an inventory and price update object for use prior to the preparation of an order.

EXAMPLE 4

Merchandise Order Processing and Confirmation Retail Catalog on CD-ROM

A powerful electronic merchandising tool can be provided by providing the user with a full-function order generating capability and employing transporter 14 to transmit a user—created merchandise order, effortlessly and seamlessly, to a remote order-processing server. To this end, server 22 should be interfaced to the necessary merchant processing services for checking and reporting credit and inventory status.

An additional valuable option enables the system to apply pre-specified user instructions, previously obtained through user interface 28, to determine whether out-of-stock items are to be dropped, back-ordered, or substituted in color or other aspect. This information can be added to the electronic order form object, listed in object manifest 48 and become the subject of a further transport dialog between the user's station and server 22. In this manner a sophisticated purchase transaction is completed in a substantially unattended manner (save for deciding about back orders off-line), in as much as the customer does not have to maintain a phone conversation, while fully achieving the capabilities of telephone order placement. A further user benefit can be obtained by the providing a permanent record of the transaction (a stored electronic file) without user intervention. This not possible with telephone ordering.

This novel, automated, modem driven, order placement system effectively shields a merchant from having to deal with the problems of establishing communications with a mass of unknown end user computer systems, while automating the process and relieving the merchant of the costs of telephone sales staff. This aspect of the invention is valuable in avoiding troublesome, support intensive, communications which are subject to rapid technical change as new products are absorbed into the marketplace. In contrast, the merchant's special purpose vendor link 50 to the server 22, can remain relatively stable, while the customer interface at server 22, depending upon the sophistication and universality of the API's 40 and 42, and also upon any emergent communications standards, can be adapted to accommodate a range of future products.

EXAMPLE 5

Further Applications of the Invention Locked Information Products

As discussed in the "BACKGROUND OF THE INVENTION" hereinabove, some vendors, for example Microsoft Corporation, distribute information products in locked, inaccessible form, accompanied by (user-accessible) promotional information and demo versions. The prospective purchaser then calls an 800 number to order the product and is given a code which is entered to unlock the item for use. The inventive information transport component 14 and cooperative server component 22, can be used to simplify this process, and eliminate the voice call.

The information transport component 14 is used to place the order and as a subsequent step concomitant with satisfaction of the merchants purchase requirements (payment, etc) can, employing a suitable line entry or entries in the object manifest 48, fetch the access code, as an information object 46, in the same way as an order acknowledgment or other information update. The user interface and data management components of the distribution CD, or original information product, can be programmed automatically to use the code to unlock the product.

Employing the novel, digital, modem-enabled communications products of the invention, more sophisticated access codes than are suitable for verbalizing to a caller, can be used, and may include small programs or decompression utilities (although these would better be stored in the locked product), or customer-specific coding employing user-derived information. Thus, as a safeguard against fraud, being equipped with specific user or user product information, the access code can be a key or product uniquely matched to the user's locked product copy.

Computer Software Updates: For distribution of updates to software products, the original distribution version of the software product can provide registered users with an appropriate ID code and update schedule. Should the revision be delayed, a revised schedule can be fetched.

Tax or other governmental filings and exchanges: An example of the generality of the inventive information transport system for sending and fetching well-defined information objects of many kinds is in the filing of tax returns. A send information object can be created and manifested to submit electronic tax filings to the IRS, as described above, for electronic product order forms. A fetch object can be created to obtain updated tax forms and the program logic relating to them, and to get information on new regulations. Analogous uses will be apparent to those skilled in the relevant arts of, for example, financial planning and portfolio management systems, to obtain current statistics, place orders, and the like.

Packaging of Transporter with User Interface/Database Search Software Facilities In a modified embodiment, the inventive information transport component 14 is integrated with a general purpose user interface/database search (UI/DB) software package and tools. Such packages and tools, sometimes referred to as "authoring packages", are now used to produce CD-ROM's and similar information products. Thus a single UI/DB product may contain the inventive information transport component 14, and be supplied to publishers to be used to develop a family or diversity of information products, as a standard tool box.

A combination of the inventive information transporter product with such UI/DB products could facilitate development of applications by allowing much of the work of integrating a containing product's user interface 28 and database functions 30 and 32 (which could be controlled through the UI/DB product) with the inventive information transport component 14 to be performed once, in advance, by a UI/DB software vendor's skilled specialists, for use in a diverse range of products using that vendor's software. Such integrated offering would be advantageous to both the software vendor (by enriching its offering) and to the software vendor's publisher-customers by facilitating the desired function.

Electronic Product Distribution Service

In a valuable application of the novel electronic information transport products of the invention, remote server 22 can be operated to provide an electronic data product distribution service for multiple containing information products 12, each equipped with an information transport component 14, the whole facility providing a complete network distribution service, including network, technical and end-user support. Provision of such a distribution service is greatly facilitated by the novel transporter 14, described herein, the use of which for each vended product greatly simplifies the problems of handling updates to multiple products. However, such a novel service could also be operated with conventional software communications products by relying upon users of each to execute an appropriate sequence of menu selection and command line instructions to obtain an update by modem via their own pre-existing communications software. Similarly, While special advantages of seamless user adoption and integration into an original product accrue from the use of the inventive transporter to distribute product updates, such a distribution service can be used with advantage to distribute any type of electronic information product.

For many publishers (and for providers of UI/DB authoring software) the task of operating a publicly available server 22, and of supplying associated technical support to a wide base of customers using a diversity of communications products, even with the simplification benefits provided by the inventive transport product, is a task requiring specialized skills and staffing that a publisher, even one experienced in electronic publishing, will generally lack. Such a specialist capability is intimidating to provide and difficult to cost-justify for the limited number of information products that one publisher can supply.

By providing a new turnkey service or service bureau a specializing, skilled vend or would enable the publisher to a void such burden. A provider of such a novel service can spread the costs of such operational activities and skilled staff across a large number of publishers a nd information products, achieving economies of scale and specialization.

The inventive information transport products extend to software implemented at server 22, or at one or more clients or satellite servers, of a network served by server 22, to provide the server-location functions of such an electronic product distribution service. such distribution software can be separately marketed to publishers or UI/DB vendors who wish to operate such a service.

Gatewayed, "Open" Server

Example 4, above, shows how information transporter 14, as well as server 22 can remain simple yet provide a highly general and extensible service. In that example, server 22 provides the functionality of a general-purpose transaction gateway or interface to an external function processor. In this particular case, the external function processor gatewayed by server 22 via vendor link 50, is the merchant's order processing system, which receives the order, determines its disposition, and responds with order status information which is relayed back to server 22 for return to the customer as a response object in accord with protocols 38 and 44. The user need not be aware of such complexities, nor do the client transport components 14 of the inventive product need to be aware of, or provide information for remote routing via vendor link 50. Only the server 22 needs this information, and server 22 needs only to know that send objects with names that fall within a specified class for a specified product ID, must be forwarded to a specified external processor, and that the corresponding responses from that processor must be routed back to an originating client as response objects. Thus the inventive information transport component 14, by virtue of its simplicity has general applicability and many uses, as described herein and as will further be apparent to those skilled in the art.

In implementing an ordering service using the inventive information transport component 14, order and response objects are preferably formatted by the containing information product 12 to be consistent with existing or future electronic data interchange (EDI) standards which define protocols and formats for data interchange between customers and vendors. The information transport component 14 and the server protocol 44 provide the low-level EDI transport functions and are independent of object content defined by higher layers of the EDI protocol. Preferably, the server has added routing layer information to move objects to and from the external processor.

To provide a suitable EDI-compatible function, server 22 can be programmed with such higher layer EDI routing data for its exchanges with the merchant's external processor. Employing such a gatewayed system, a single EDI network connection can be used to connect the server 22 to a large number of different merchant processors anywhere in the world, across wide area networks and links between same, for example Internet.

This concept of an "open" server, providing a gatewayed pathway for information objects to travel between a wide base of users and one or more remote vendors or other object sources is greatly facilitated, or enabled, by employment of the inventive transporter 14 which effectively provides a protocol translation function enabling a simple information transport service to be offered which is easy and economical to use, both for the end user and the vendor or information supplier. Such a transport service compares favorably, for its intended information transport purposes with broader function and more complex of full online services, such as COMPUSERVE (trademark), and the like, described hereinabove.

Further Embodiments with Broadcast, Subscription Delivery and On-demand Capabilities Receipt of broadcast data: As an alternative to modem-based wireline or wireless calling to a server and requesting data objects, the information transporter system of this invention can be beneficially employed in a broadcast information distribution system wherein data information objects are contained within a broadcast data stream with recipient communications devices tuned to identify and receive from the broadcast specific data elements to which they are entitled. On the Internet, such broadcasting to a selected group of recipients is called "multicasting".

Broadcasting can be airwave broadcasting via satellite, FM, or TV subchannels in the manner, for example, used by Mainstream Data Ltd. for the broadcast of news wires. Alternatively, the broadcast data stream may be cable or line transmitted, for example, over cable television systems. Minor extensions to API's 40 and 42 could accommodate such a facility. A modified setup function could alert a user's receiving communications device to watch for receipt of data objects identified as relating to the original or containing information product, and to capture and hold identified objects in temporary storage. A schedule transport function can then be set to fetch the received data objects from temporary storage and prepare them for use.

Subscription delivery: Although the invention has been described as being particularly applicable to the solution of problems arising in distributing updates of original or previously purchased or delivered electronic information products, those skilled in the art will appreciate that many of the benefits of the invention can be obtained without any initial information content being delivered to the user with the original product. The user could simply receive the information transporter 14 and all product information could be received subsequently, after installing the information transporter 14, in the form of fetch objects transmitted from a remote server or other suitable source. For example, a newsletter service could provide a disk with the transporter and a user interface, but with no initial information content. As the transporter 14, operating at the user stations, automatically fetches new issues according to the newsletter schedule, the information is, in effect, pushed down a channel from the distribution server for delivery to the base of subscribing users.

Information-on-demand services: In another embodiment, providing an information product on demand service, vendors can freely distribute a novel electronic marketing product comprising a transporter on diskette, along with a simple user interface and a catalog of information product items available from the vendor, without including the products themselves. Such an electronic marketing product could be distributed through the mail, as a magazine insert giveaway, or through any other suitable marketing medium. The transporter could be activated at any time by the user to call in and fetch a cataloged product, as well as a current catalog, possibly after sending a credit card order form, or the product price could be paid to the vendor by obtaining the product from a 900 number providing vendor reimbursement from the telephone network.

Open Architecture Online Service Access

In a further aspect, the invention provides an information transport component 14 that functions as universal or generic client interface software, enabling a user client to work with any one or more of many online server-based information distribution services.

Many online information distribution services used to disseminate electronic publications comprise intelligent user interfaces which employ a client component running on a customer's personal computer (PC) to communicate with a central server facility operated by the online service, by means of a proprietary protocol. The client interface packages are proprietary to a particular online service.

Prospective publishers wishing to offer electronic products online, contract with online service providers to enable customers to use the online service's client software to access the publisher's material and related online communications services (bulletin boards, etc.) on the services' servers. The publisher is limited to using the presentation facilities provided by the user interface in the online service's client software. This limitation impedes migration of publisher offerings and makes it difficult for either a customer or a publisher to swing information transport component 14 access from one service provider to another because each service requires its own software package.

Third party interface developers cannot contribute to such online interfaces for a publisher without the cooperation of the online service provider which may be difficult or impossible to obtain. Accordingly, only limited user interfaces with moderate sophistication and variety can be offered.

Accordingly in another aspect, to provide open architecture online service communication, the inventive information transport component 14 can be embodied as a flexible client interface which can be actuated to operate with any one of a number of online services by providing a generic client interface foundation API (application program interface) combined with a set of translators and protocol drivers capable of communicating the user's functional requests to any one of a set of online services, using their corresponding proprietary protocols.

In this aspect the invention permits publishers to develop highly sophisticated and individualized user interfaces independently of the limitations of the online service providers' capabilities. Such enhanced user interfaces are attractive to publishers seeking differentiation of their products by providing an appealing individualized interface with a signature look and feel. In contrast, online service providers seeking to economically carry content from many publishers provide generic interfaces acceptable to all.

By incorporating operational translators for a number of online service protocols, which translators fully adhere to the detailed specifications of each protocol, a multiservice capability can be provided.

Online services generally provide similar types of services with nearly standard functions and similar user interfaces. Major service types include bulletin board, chat, electronic mail, document browsing, and database search. Use of creative typography, layout, graphics, and other artistic elements to offer the presentation quality and variety typical of print media is desired by publishers using this medium.

The invention facilitates this end by providing open development platforms for development of advanced interfaces while shielding developers from the complex details of communication with an online server. The shielding is accomplished by providing an API which supports communications service requests at a simple functional request level.

Figure 3:
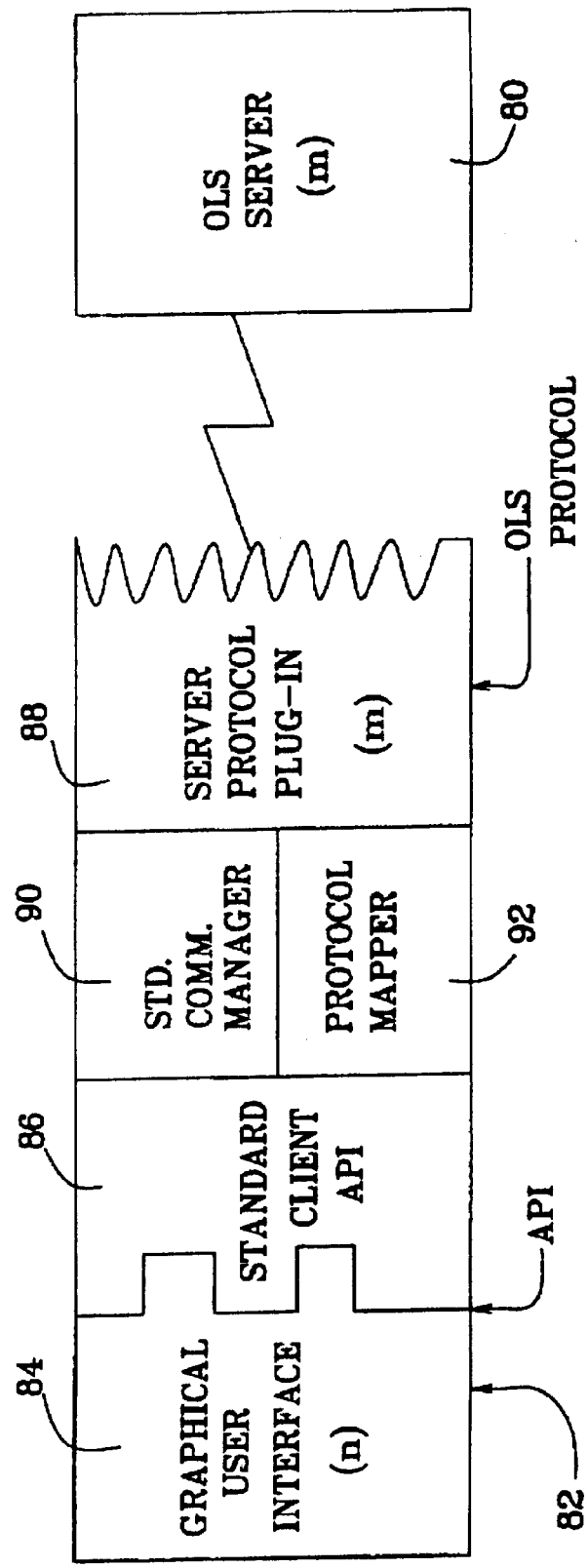
FIG. 3 is a schematic diagram of a server-based electronic distribution service employing an inventive information transport software component.

Referring to FIG. 3, multiple targeted online services 80, can be accessed by a client interface 82 comprising any of multiple graphical user interfaces 84 driving a generic API 86 which works with plug-in translator/communicator modules 88 which are provided to communicate one to each targeted online service 80. Modules 88 mimic the online service's protocols, so as to be essentially indistinguishable from the proprietary interface s normally used. A communications manager 90 receives input from API 86 and outputs through protocol mapper 92 which selects the appropriate protocol.

In this embodiment, for use with full-function online services, the functions of API 86 and protocol 88 are extended to support extended, open-ended interactive sessions and the more varied client-server interaction needs of session-oriented interactive online applications such as bulletin board posting and browsing, online chat, electronic mail, database and menu browsing, and database search.

Similarly, in the aspect shown in FIG. 3, the invention can be provided with the same kind of additional flexibility with regard to the user's connection to server 22 as the invention can provide for more basic fetch and send functions. While the inventive client server protocol 38 and 44 is particularly suited to the functions described, other existing or future services and corresponding protocols could be used, if necessary with adaptation, to provide workable services for use in conjunction with transport component 14. Such use may require modification of communications module 36 and protocol 38 by the addition of a protocol mapper 92 and appropriate server protocol plug-in 88 to communicate to an alternative server.

In either case, such added flexibility in use of the inventive product increases a publisher's choices in selecting server and network facilities through which to distribute information products, and enables the publisher to offer fully customized user interfaces for use with multiple, or any one of multiple server and network services which do not provide for such customization. In this embodiment of the inventive transport component, a containing product can offer a unique custom interface and provide for access to additional information products from such varied source facilities as the Internet, full function online services, emerging groupware network services, conventional bulletin board systems, and future network services using wireless or cable television technology.

While the invention can provide a flexible, generic API, in some circumstances, an existing third-party API designed for use with a single specific online service can be combined with an embedded transporter and server protocol mapper to allow products designed to use the third-party API to employ any of multiple servers for distribution, avoiding commercial distribution restraints associated with that API, for example use of a particular server.

The inventive protocol mapper 92 can insulate a containing information product from the variations among such services, and can allow a single such information product to be transported through a variety of such services, and to later be moved to other such services by simply selecting an alternative protocol mapper. Multiple such protocol mappers can be packaged within a given information product to permit alternatives to be selected by the end-user from a list. Thus the invention further permits information products and related UI/DB authoring tools to be service-independent and neutral.

Figure 4:
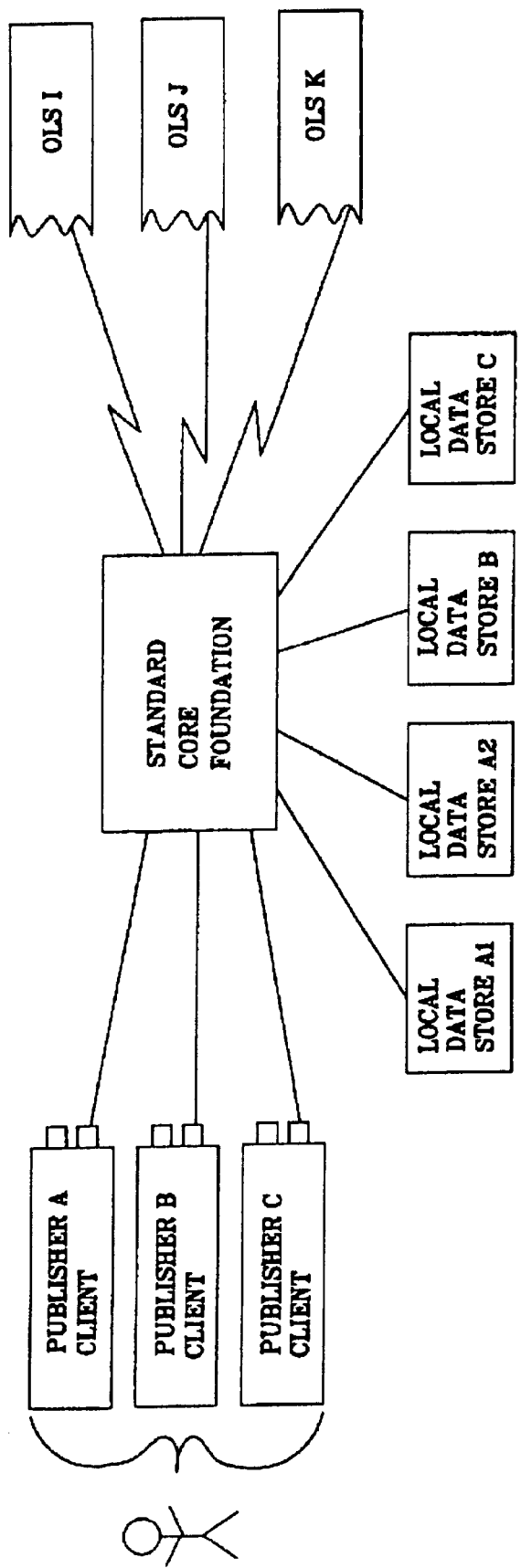
FIG. 4 is a further schematic diagram of the service illustrated in FIG. 3.

FIG. 4 provides an overview of the use of the inventive client interface accessing multiple publications via multiple remote online services, as well as multiple locally mounted data sources and storing additional retrieved data locally.

Enhancements can enable a publisher's service to provide integrated, seamless access to content distributed over several different online services; to seamlessly combine access to both online and local CD-ROM-based content; and to coexist with and share resources with other publishers' services on the user's PC.

In summary, the invention provides, in this aspect, a simple, easy-to-use multi-protocol capability that enables an electronic information object to be transported from a publisher to a wide base of users by any one of a number of online services, without sacrificing individual product identity.

Recursive Updating of the Transporter

Another application of the inventive information transport product, or transporter, is a recursive use to update itself, in the same manner that the transporter can update a containing information product. This method can be useful in a variety of ways, including to upgrade the transporter by the addition of new protocol components, new compression techniques, or new network access methods.

An important class of such self-updates is to provide added flexibility in specifying network access procedures. For example, the user setup routine could be extended into a two stage process. In a first stage, each user's transporter calls in to a common pre-set phone number, in order to fetch a second phone number selected according to the user's particular product, location, or some other parameter. The second phone number, or other address, can then placed in the setup as an update, to be used in subsequent transport operations.

This two-stage method can provide efficient use of a single pre-set toll-free 800 number for an initial call from any number of different products, which initial call yields a second number corresponding to a specific Product ID, which number is used for subsequent calls.

In an advantageous embodiment, the second number is not toll free and may include vendor charges, in the manner of a 900 number. This arrangement enables a system in which users do not pay for initial setup calls (and any failed connections which might result from initial setup problems), but do pay long-distance toll charges, and per call vendor fees if the publisher so desires, for subsequent product information transport from the second number. This two-number process can be carried out without requiring any phone number entry or selection by the user. Additionally, the second number can readily be changed whenever desired by the publisher, even after product discs have been shipped.

User's Station

References herein to a user's station, workstation, computer or terminal will be understood to embrace any "information appliance" or intelligent device having the basic computer-like functions of programmed logic, storage and presentation, or having the ability to support an operating system for managing user input-output with a processor, including intelligent cable television controllers, video game players, information kiosks, wired and wireless personal communicators, and even system controllers such as automotive computers.

Benefits Provided by the Invention

Employing the novel information transport component 14 interacting with remote server 22 through communications protocols 38 and 44, the invention enables the following advantageous objectives and other benefits to be achieved:

i) simple and easy execution of one or more fetch or send transactions to or from a remote server, by an ordinary, unskilled user with no human interaction at either end being necessary after initiation;

ii) automated transport of predefined information objects between client and server in a closed-ended fashion, without burdening a client-based user with complex routing logic; and iii) creation of an economic, easy-to-use, function-specific, self-contained information transport component 14 software module suitable for mass distribution in a containing information product.

The preferred use of an object manifest in a transport control mechanism which includes transporting the object manifest between client user and server, and referencing the object manifest by user fetch-send protocol 38 and server fetch-send protocol 44 facilitates achievement of the following additional objectives:

iv) simple, tight-knit control of the communication process and of error handling; and v) creation of a transport control mechanism, and thence of an information transport component 14, which operates smoothly and transparently to the user and independently of the information object content or of the nature of the application.

The invention thus provides an information transport software component which can be employed to transport a wide variety of data objects or applications and can be easily incorporated in many different information products to provide multiple novel containing information products 12 with built-in automated updatability or upgradability executable at an appropriate time by simple, user-menu selection or automatically.

Further Benefits

In addition to the benefits of a powerful and efficient information transport method, use of a standard, formalized transporter, its API, and client-server protocol, pursuant to the teachings of the invention disclosed herein, can provide any or all of the following significant benefits to users, information product vendors, application vendors, service providers, tool vendors or others:

vi) use of a standardized facility to perform a well defined function in a known way (with available implementations for a varied and expanding set of hardware and software platforms);

vii) reliance on a standardized facility that can be extensively tested and proven reliable across a wide variety of equipment and conditions;

viii) reduced need for information product developers (and users, and user interface/database search software vendors) to know and understand the complexities (and rapid evolution) of data communications;

ix) ability to build a single functional interface that can smoothly employ a dynamically expanding variety of communications facilities and technologies;

x) ability to obtain operations and user support services relating to the difficult task of managing a server and its communications with large numbers of end-users;

xi) user-recognition of the novel information transport facility across a range of unrelated products, establishing a positive brand cachet benefiting users and vendors alike;

xii) ability to package the transporter facility with other tools, such as a UI(user interface) and database search capability to extend the value of those tools economically and with the ability to gain the benefits described above; and xiii) control of communications costs and failures by elimination of human intervention, with its attendant time-consuming delays and errors, from the period during which the user's station is connected in real time communication with remote server 22.

Stated succinctly, by having the novel information transport component rely entirely on a containing information product for all user interface and information presentation functions, there need be no restrictions on the creativity of the containing product imposed by the needs of a third party communications product. Thus the containing information product can present transport functions with any desired look and feel.

Another advantage of the information transport system of the invention is the avoidance of difficult or complex navigation tasks, and the use of simple direct dial communications which are suitable for sessions that are short and infrequent. The inventive information transport products described herein are consistent with or readily adaptable to the needs of many publishers of a diversity of materials, which needs are commonly centered on discrete products and content.

A further advantage of the invention, from the point of view of publishers, is that because the call is customer initiated, the customer pays transport costs (telephone line charges), simplifying costing for the publisher who avoids having to figure shipment or other transportation costs before sale and build these costs into the price of the product or update.

The inventive approach to mass distribution of electronic information products described herein can also provide advantages in high-value environments such as those of Counterpoint Publishing's Federal Register products cited hereinabove, providing a more seamless integration of the fetching of updates received via modem (and selected and extracted by the user from the "Daily Federal Register") with the original product on CD-ROM, the "CD Federal Register". Product installation can be simplified, and a separate user invocation of, and interface to, a general purpose communications package can be avoided. In addition, by employing the user's pre-existing modem and avoiding need for a general purpose communications product license, significant cost savings can be obtained.

The better to comprehend its possible applications and enhancements, embodiments of the invention can be grouped in four levels, as a follows.

Level zero A novel basic transport function embeddable in any of a range of electronic information products to provide economical unattended updates.

Level one Basic transporter 14 incorporating API's 40 and 42 adds a powerful new capability to be used with an electronic information product's custom user interface and database management facility for seamless integration of an update with an original product. other options can integrate with relevant third-party packages such as authoring packages.

Level one (Server enhanced) Adds server operation and user support features enabling publishers to outsource tasks which may be difficult or unfamiliar to them.

Level Two Adds optional translation or use of alternative server protocols enabling an embeddable transporter product to work with many different servers or services including, for example, standard BBS's, Internet servers, and special transport services such as those offered or proposed by communications providers such as AT&T, MCI, Compuserve, America Online and cable television systems.

Level Three Adds a full online service user interface API with correspondingly enhanced client-server protocols to provide for full-function online service sessions with user interface control and with ability to work with a range of online services, providing a publisher with flexibility in their use of existing and emerging services.

While an illustrative embodiment of the invention has been described above, it is, of course, understood that various modifications will be apparent to those of ordinary skill in the art. Such modifications are within the spirit and scope of the invention, which is limited and defined only by the appended claims.

What is claimed is:

1. An automated electronic information transporter located at a user station for controlling transport of information objects on a communications network providing access to multiple remote sources, the information transporter comprising:

(a) a communications module which effects the fetching or sending of information objects across the network between at least one of the remote sources and persistent storage at the user station; and (b) a transport control module which controls transport of the information objects in accordance with:

i) a source address for the at least one remote source; and ii) an object manifest specifying at least one information object to be transported;

wherein a higher level software entity can be invoked to modify the object manifest, and wherein the higher level software entity comprises a viewer for at least one content type available on the communications network, the content type being selected from the group consisting of multimedia formats, video formats, sound formats and hypertext markup language ("HTML").

2. An automated electronic information transporter located at a user station for controlling transport of information objects on a communications network providing access to multiple remote sources, the information transporter comprising:

(a) a communications module which effects the fetching or sending of information objects across the network between at least one of the remote sources and persistent storage at the user station; and (b) a transport control module which controls transport of the information objects in accordance with:

i) a source address for the at least one remote source; and ii) an object manifest specifying at least one information object to be transported;

wherein a higher level software entity can be invoked to modify the object manifest, wherein the higher level software entity comprises a viewer for at least one content type available on the communications network, the content type being selected from the group consisting of multimedia formats, video formats, sound formats and hypertext markup language ("HTML"), and wherein the communications network is the Internet.

3. An automated electronic information transporter located at a user station for controlling transport of information objects on a communications network providing access to multiple remote sources, the information transporter comprising:

(a) a communications module which effects the fetching or sending of information objects across the network between at least one of the remote sources and persistent storage at the user station; and (b) a transport control module which controls transport of the information objects in accordance with:

i) a source address for the at least one remote source; and
ii) an object manifest specifying at least one information object to be transported;
wherein:
i) the communications network is a broadcast network comprising multiple user stations each provided with the information transporter;
ii) at least one of the remote sources broadcasts a data stream across the network for receipt by the user stations;
iii) the object manifest at each user station defines data stream content elements for receipt by the user station; and
iv) a higher level software entity can be invoked to modify the object manifest.

4. An automated electronic information transporter located at a user station for controlling transport of information objects on a communications network providing access to multiple remote sources, the information transporter comprising:
(a) a communications module which effects the fetching or sending of information objects across the network between at least one of the remote sources and persistent storage at the user station; and
(b) a transport control module which controls transport of the information objects in accordance with:
i) a source address for the at least one remote source; and
ii) an object manifest specifying at least one information object to be transported,
wherein:
i) the communications network comprises a group of user stations each provided with the information transporter and each being a client station of an information object distribution service provided by at least one of the remote sources;
ii) the at least one remote source has, for each user station, an object manifest received across the network from the user station and specifying user station identification information;
iii) each user station repeatedly receives objects transported by the at least one remote source; and
iv) a higher level software entity can be invoked to modify the object manifest.

5. An automated electronic information transporter located at a user station for controlling transport of information objects on a communications network providing access to multiple remote sources, the information transporter comprising:
(a) a communications module which effects the fetching or sending of information objects across the network between at least one of the remote sources and persistent storage at the user station; and
(b) a transport control module which controls transport of the information objects in accordance with:
i) a source address for the at least one remote source; and
ii) an object manifest specifying at least one information object to be transported,
wherein:
i) the communications network comprises a group of user stations each provided with the information transporter and each being a client station of an information object distribution service provided by at least one of the remote sources;
ii) the at least one remote source has, for each user station, an object manifest received across the network from the user station and specifying user station identification information;
iii) each user station repeatedly receives objects transported by the at least one remote source;
iv) a higher level software entity can be invoked to modify the object manifest; and
v) the object manifest received at the remote source specifies user-desired content and the information objects transported by the remote source to the user station are selected according to the user-desired content specification.

6. An automated electronic information transporter located at a user station for controlling transport of information objects on a communications network providing access to multiple remote sources, the information transporter comprising:
(a) a communications module which effects the fetching or sending of information objects across the network between at least one of the remote sources and persistent storage at the user station; and
(b) a transport control module which controls transport of the information objects in accordance with:
i) a source address for the at least one remote source; and
ii) an object manifest specifying at least one information object to be transported,
wherein:
i) the communications network comprises a group of user stations each provided with the information transporter and each being a client station of an information object distribution service provided by at least one of the remote sources;
ii) the at least one remote source has, for each user station, an object manifest received across the network from the user station and specifying user station identification information;
iii) each user station repeatedly receives objects transported by the at least one remote source;
iv) a higher level software entity can be invoked to modify the object manifest;
v) the object manifest received at the remote source specifies user-desired content and the information objects transported by the remote source to the user station are selected according to the user-desired content specification; and
vi) the user-desired content specification comprises a generic or an alias name to request a latest installment, version or update.

7. An automated electronic information transporter located at a user station for controlling transport of information objects on a communications network providing access to multiple remote sources, the information transporter comprising:
(a) a communications module which effects the fetching or sending of information objects across the network between at least one of the remote sources and persistent storage at the user station; and
(b) transport control module which controls transport of the information objects in accordance with:
i) a source address for the at least one remote source; and
ii) an object manifest specifying at least one information object to be transported;

wherein:
  i) the communications network comprises a group of user stations each provided with the information transporter and each being a client station of an information object distribution service provided by at least one of the remote sources;
  ii) the at least one of the remote sources has, for each user station, an object manifest received across the network from the user station and specifying user station identification information;
  iii) each object manifest contains user-specified information object selections; and
  iv) each user station transporter is scheduled to communicate repeatedly and automatically with the at least one of the remote sources and fetch information objects meeting the user-specified information object selections.

8. An automated electronic information transporter located at a user station for controlling transport of information objects on a communications network providing access to multiple remote sources the information transporter comprising:
  (a) a communications module which effects the fetching or sending of information objects across the network between at least one of the remote sources and persistent storage at the user station; and
  (b) a transport control module which controls transport of the information objects in accordance with:
    i) a source address for the at least one remote source; and
    ii) an object manifest specifying at least one information object to be transported;
    wherein:
      i) the communications network comprises a group of user stations each provided with the information transporter and each being a client station of an information object distribution service provided by at least one of the remote sources;
      ii) the at least one of the remote sources has, for each user station, an object manifest received across the network from the user station and comprising user-specified information object selections; and
      iii) each user station transporter can fetch or receive a response object from the one of the remote sources providing the user-specified information object selections; and
      iv) a higher level software entity can be invoked to modify the object manifest.

9. An automated electronic information transporter located at a user station for controlling transport of information objects on a communications network providing access to multiple remote sources, the information transporter comprising:
  (a) a communications module which effects the fetching or sending of information objects across the network between at least one of the remote sources and persistent storage at the user station; and
  (b) a transport control module which controls transport of the information objects in accordance with:
    i) a source address for the at least one remote source; and
    ii) an object manifest specifying at least one information object to be transported;
  wherein a higher level software entity can be invoked to modify the object manifest, and
  wherein the information transporter is embedded in a containing information product, the transporter functionality being activatable via the information product.

10. An automated electronic information transporter located at a user station for controlling transport of information objects on a communications network providing access to multiple remote sources, the information transporter comprising:
  (a) a communications module which effects the fetching or sending of information objects across the network between at least one of the remote sources and persistent storage at the user station; and
  (b) a transport control module which controls transport of the information objects in accordance with:
    i) a source address for the at least one remote source; and
    ii) an object manifest specifying at least one information object to be transported;
  wherein a higher level software entity can be invoked to modify the object manifest,
  wherein the information transporter is embedded in a containing information product, the transporter functionality being activatable via the information product, and
  wherein the containing information product is selected from the group consisting of self-updated software products, self-updating database products, CD-ROM resident products, online hybrid products, Internet access products, offline Internet access products, mobile Internet access products, short-session Internet access products, or intelligent appliance products.

11. An automated electronic information transporter located at a user station for controlling transport of information objects on a communications network providing access to multiple remote sources, the information transporter comprising:
  (a) a communications module which effects the fetching or sending of information objects across the network between at least one of the remote sources and persistent storage at the user station; and
  (b) a transport control module which controls transport of the information objects in accordance with:
    i) a source address for the at least one remote source; and
    ii) an object manifest specifying at least one information object to be transported;
  wherein a higher level software entity can be invoked to modify the object manifest, and
  wherein the transport control module specifies object processing actions required to integrate an object into one of an application and an information product on the user station subsequent to transport.

12. An automated electronic information transporter located at a user station for controlling transport of information objects on a communications network providing access to multiple remote sources, the information transporter comprising:
  (a) a communications module which effects the fetching or sending of information objects across the network between at least one of the remote sources and persistent storage at the user station; and
  (b) a transport control module which controls transport of the information objects in accordance with:

i) a source address for the at least one remote source; and ii) an object manifest specifying at least one information object to be transported;

wherein a higher level software entity can be invoked to modify the object manifest, and wherein the manifest list is mobile and transportable in the transport session, moving in a predetermined direction between the source station and the user station to request at least one information object to be sent in the other direction between the source station and the user station.

13. An automated electronic information transporter located at a user station for controlling transport of information objects on a communications network providing access to multiple remote sources, the information transporter comprising:

(a) a communications module which effects the fetching or sending of information objects across the network between at least one of the remote sources and persistent storage at the user station; and (b) a transport control module which controls transport of the information objects in accordance with:

i) a source address for the at least one remote source; and ii) an object manifest specifying at least one information object to be transported;

wherein:

the transport control module uses an object manifest comprising at least one of a send object list, and a fetch object list, and the user station includes a user interface provided by a vendor associated with the source, and the object manifest is created under control of the user interface from choices supplied by the vendor.

14. An automated electronic information transporter located at a user station for controlling transport of information objects on a communications network providing access to multiple remote sources, the information transporter comprising:

(a) a communications module which effects the fetching or sending of information objects across the network between at least one of the remote sources and persistent storage at the user station; and (b) a transport control module which controls transport of the information objects in accordance with:

i) a source address for the at least one remote source; and ii) an object manifest specifying at least one information object to be transported;

wherein:

a higher level software entity can be invoked to modify the object manifest;

the user station is capable of executing multiple communications protocols;

the transport control module is responsive to a protocol selection code; and the send object list comprises one or more object list elements selected from the group consisting of object action codes specifying source station actions required, object names, object sizes and response object size.

15. An automated electronic information transporter located at a user station for controlling transport of information objects on a communications network providing access to multiple remote sources, the information transporter comprising:

(a) a communications module which effects the fetching or sending of information objects across the network between at least one of the remote sources and persistent storage at the user station; and (b) a transport control module which controls transport of the information objects in accordance with:

i) a source address for the at least one remote source; and ii) an object manifest specifying at least one information object to be transported;

wherein:

a higher level software entity can be invoked to modify the object manifest;

the transport control module is responsive to a completed object manifest having codes to convey the status of the transport operation or to provide for transport of additional information objects, or both; and for a send operation in which an information object is transported from the user station to the source, the completed object manifest comprises one or more manifest elements selected from the group consisting of send object additional information, object acceptance codes returned by the source, time of object acceptance codes, response object names and a completion status code to terminate the send operation and return control.

16. An automated electronic information transporter located at a user station for controlling transport of information objects on a communications network providing access to multiple remote sources, the information transporter comprising:

(a) a communications module which effects the fetching or sending of information objects across the network between at least one of the remote sources and persistent storage at the user station; and (b) a transport control module which controls transport of the information objects in accordance with:

i) a source address for the at least one remote source; and ii) an object manifest specifying at least one information object to be transported;

wherein:

a higher level software entity can be invoked to modify the object manifest;

the transport control module is responsive to a completed object manifest having codes to convey the status of the transport operation or to provide for transport of additional information objects, or both;

for a send operation in which an information object is transported from the user station to the source, the completed object manifest comprises one or more manifest elements selected from the group consisting of send object additional information, object acceptance codes returned by the source, time of object acceptance codes, response object names and a completion status code to terminate the send operation and return control; and the completed object manifest further comprises polling indicator codes enabling polling of the user station by the source for readiness to perform additional transport operations.

17. An automated electronic information transporter located at a user station for controlling transport of information objects on a communications network providing access to multiple remote sources, the information transporter comprising:
(a) a communications module which effects the fetching or sending of information objects across the network between at least one of the remote sources and persistent storage at the user station; and
(b) a transport control module which controls transport of the information objects in accordance with:
i) a source address for the at least one remote source; and
ii) an object manifest specifying at least one information object to be transported;
wherein:
a higher level software entity can be invoked to modify the object manifest
the transport control module is responsive to a completed object manifest having codes to convey the status of the transport operation or to provide for transport of additional information objects, or both;
for a send operation in which an information object is transported from the user station to the source, the completed object manifest comprises one or more manifest elements selected from the group consisting of send object additional information, object acceptance codes returned by the source, time of object acceptance codes, response object names and a completion status code to terminate the send operation and return control; and
the completed object manifest further comprises scheduled update indicator codes enabling scheduled fetching of updates by the user station from the source.

18. An automated electronic information transporter located at a user station for controlling transport of information objects on a communications network providing access to multiple remote sources, the information transporter comprising:
(a) a communications module which effects the fetching or sending of information objects across the network between at least one of the remote sources and persistent storage at the user station; and
(b) a transport control module which controls transport of the information objects in accordance with:
i) a source address for the at least one remote source; and
ii) an object manifest specifying at least one information object to be transported;
wherein a higher level software entity can be invoked to modify the object manifest, and
wherein:
the transport control module comprises a transport software component embeddable in a vendor-provided information product;
the vendor provides update objects from a selected source; and
the transport software component is separately suppliable to multiple vendors of respective information products.

19. An automated electronic information transporter located at a user station for controlling transport of information objects on a communications network providing access to multiple remote sources, the information transporter comprising:
(a) a communications module which effects the fetching or sending of information objects across the network between at least one of the remote sources and persistent storage at the user station; and
(b) a transport control module which controls transport of the information objects in accordance with:
i) a source address for the at least one remote source; and
ii) an object manifest specifying at least one information object to be transported;
wherein:
a higher level software entity can be invoked to modify the object manifest;
the transport control module comprises a transport software component embeddable in a vendor-provided information product;
the vendor provides update objects from a selected source;
the transport software component is separately suppliable to multiple vendors of respective information products; and
the transport software component further comprises a vendor-related user interface permitting specification of transport objects in the object manifest.

20. A method of controlling transport of information objects between persistent storage at a user station and a remote information object source on a communications network using an information transporter comprising a communications module for sending and receiving information objects on the network and wherein the method comprises:
(a) communicating object transport specifications, including a source address for the remote information object source, between the information transporter and a higher level software entity employing an object manifest listing at least one information object to be transported;
(b) activating the communications module to transport the at least one information object to or from the source address, in accordance with the object manifest; and
(c) scheduling the transporter to communicate repeatedly and automatically with the remote information object source and transport information objects,
wherein:
the communications network is a broadcast network comprising multiple user stations each provided with the information transporter; and
the remote information object source broadcasts a data stream across the network for receipt by the user stations, the method further comprising:
(d) receiving at each user station data stream content elements defined by specifications in the object manifest.

21. A method of controlling transport of information objects between persistent storage at a user station and a remote information object source on a communications network using an information transporter comprising a communications module for sending and receiving information objects on the network and wherein the method comprises:
(a) communicating object transport specifications, including a source address for the remote information object source, between the information transporter and a higher level software entity employing an object manifest listing at least one information object to be transported;

(b) activating the communications module to transport the at least one information object to or from the source, address in accordance with the object manifest; and (c) scheduling the transporter to communicate repeatedly and automatically with the remote information object source and transport information objects, wherein the communications network comprises a group of user stations each provided with the information transporter and each being a client station of an information object distribution service provided by the remote information object source, the method further comprising:

(d) sending to the remote information object source from each user station an object manifest specifying user station identification information; and (e) repeatedly transporting information objects to each user station from the remote information object source.

22. A method of controlling transport of information objects between persistent storage at a user station and a remote information object source on a communications network using an information transporter comprising a communications module for sending and receiving information objects on the network and wherein the method comprises:

(a) communicating object transport specifications, including a source address for the remote information object source, between the information transporter and a higher level software entity employing an object manifest listing at least one information object to be transported;

(b) activating the communications module to transport the at least one information object to or from the source address, in accordance with the object manifest; and (c) scheduling the transporter to communicate repeatedly and automatically with the remote information object source and transport information objects, wherein the communications network comprises a group of user stations each provided with the information transporter and each being a client station of an information object distribution service provided by the remote information object source, the method further comprising:

(d) sending to the remote information object source from each user station an object manifest specifying user station identification information; and (e) repeatedly transporting information objects to each user station from the remote information object source, wherein the object manifest received at the remote information object source specifies user-desired content with a generic or an alias name and wherein the method further comprises:

(f) the remote information object source sending to the user station the latest installment, version or update information objects selected according to the generic or alias name.

23. A method of controlling transport of information objects between persistent storage at a user station and an information object remote source on a communications network using an information transporter comprising a communications module for sending and receiving information objects on the network, the method comprising:

(a) communicating object transport specifications, including a source address for the remote source, between the information transporter and a higher level software entity employing an object manifest listing an information object to be transported;

(b) activating the communications module to transport the information object to or from the source address, in accordance with the object manifest, wherein the communications network comprises a group of user stations each provided with the information transporter, the object manifest at each user station contains source-originated information object specifications and each user station is a client station of an information object distribution service provided by the remote source and wherein the method further comprises:

(c) scheduling each transporter to communicate repeatedly and automatically with the remote source and transport information objects meeting the source-originated specifications.

24. A method of controlling transport of information objects between persistent storage at a user station and an information object remote source on a communications network using an information transporter comprising a communications module for sending and receiving information objects on the network, the method comprising:

(a) communicating object transport specifications, including a source address for the remote source, between the information transporter and a higher level software entity employing an object manifest listing at least one information object to be transported;

(b) activating the communications module to transport the at least one information object to or from the source address, in accordance with the object manifest, wherein the communications network comprises a group of user stations each provided with the information transporter and each being a client station of an information object distribution service provided by the remote source, the method further comprising:

(c) sending to the remote source, from each user station, the object manifest comprising user-specified information object selections; and (d) scheduling each transporter to communicate repeatedly and automatically with the remote source and transport information objects meeting the user specifications.

25. A method of controlling transport of information objects between persistent storage at a user station and an information object remote source on a communications network using an information transporter comprising a communications module for sending and receiving information objects on the network, the method comprising:

(a) communicating object transport specifications, including a source address for the remote source, between the information transporter and a higher level software entity employing an object manifest listing at least one information object to be transported;

(b) activating the communications module to transport the at least one information object to or from the source address, in accordance with the object manifest, wherein the communications network comprises a group of user stations each provided with the information transporter and each being a client station of an information object distribution service provided by at least one of the remote sources, the method further comprising:

c) fetching a features directory listings features available at the remote source from the remote source to each user station;

d) building, at each user station, an object manifest containing selected feature entries obtained from the fetched features directory; and e) scheduling each user station transporter to communicate repeatedly and automatically with the remote source and transport information objects specified by the selected features entries in the object manifest.

26. A method of controlling transport of information objects between persistent storage at a user station and a remote information object source on a communications network using an information transporter comprising a communications module for sending and receiving information objects on the network and wherein the method comprises:

(a) communicating object transport specifications, including a source address for the remote information object source, between the information transporter and a higher level software entity employing an object manifest listing at least one information object to be transported;

(b) activating the communications module to transport the at least one information object to or from the source address, in accordance with the object manifest; and (c) scheduling the transporter to communicate repeatedly and automatically with the remote information object source and transport information objects, wherein the communications network comprises a group of user stations each provided with the information transporter and each being a client station of an information object distribution service provided by the remote source, the method further comprising:

(d) sending to the remote source, from each user station, an object manifest comprising user specified information object selections; and (e) using each user station transporter to fetch or receive a response object from the remote source providing the user-specified information object selection.

27. An automated electronic information transporter located at a user station for controlling transport of information objects on a communications network providing access to multiple remote sources, the information transporter comprising:

(a) a separable communications module which selectively fetches or transports information objects across the network between at least one of the remote sources and the user station; and (b) a transport control module which controls the transport of the information objects in accordance with:
   i) a source address for the at least one remote source; and
   ii) a user-modifiable object manifest specifying at least one information object to be transported,
   wherein:
      i) the communications network is a broadcast network comprising multiple user stations each provided with the information transporter;
      ii) the at least one of the remote sources broadcasts a data stream across the network for receipt by the user stations; and
      iii) the object manifest at each user station defines data stream content elements for receipt by the user station.

28. An automated electronic information transporter located at a user station for controlling transport of information objects on a communications network providing access to multiple remote sources, the information transporter comprising:

(a) a separable communications module which selectively fetches or transports information objects across the network between at least one of the remote sources and the user station; and (b) a transport control module which controls the transport of the information objects in accordance with:
   i) a source address for the at least one remote source; and
   ii) a user-modifiable object manifest specifying at least one information object to be transported,
   wherein:
      i) the communications network comprises a group of user stations each provided with the information transporter and each being a client station of an information object distribution service provided by the at least one of the remote sources;
      ii) the at least one remote source has, for each user station, an object manifest received across the network from the user station and specifying user station identification information; and
      iii) each user station repeatedly receives objects transported by the at least one remote source.

29. An automated electronic information transporter located at a user station for controlling transport of information objects on a communications network providing access to multiple remote sources, the information transporter comprising:

(a) a separable communications module which selectively fetches or transports information objects across the network between at least one of the remote sources and the user station; and (b) a transport control module which controls the transport of the information objects in accordance with:
   i) a source address for the at least one remote source; and
   ii) a user-modifiable object manifest specifying at least one information object to be transported,
   wherein:
      i) the communications network comprises a group of user stations each provided with the information transporter and each being a client station of an information object distribution service provided by the at least one of the remote sources:
      ii) the at least one of the remote sources has, for each user station, an object manifest received across the network from the user station and comprising user-specified information object selections; and
      iii) each user station transporter can fetch or receive a response object from the one of the remote sources providing the user-specified information object selections.

30. An automated electronic information transporter located at a user station for controlling transport of information objects on a communications network providing access to multiple remote sources, the information transporter comprising:

(a) a separable communications module which selectively fetches or transports information objects across the network between at least one of the remote sources and the user station; and (b) a transport control module which controls the transport of the information objects in accordance with:
   i) a source address for the at least one remote source; and
   ii) a user-modifiable object manifest specifying at least one information object to be transported,
   wherein:
      the information transporter is embedded in a containing information product; and
      the information transporter functionality can be activated during operation of the information product.

* * * * *